US010740723B2

(12) United States Patent
Gerace et al.

(10) Patent No.: US 10,740,723 B2
(45) Date of Patent: Aug. 11, 2020

(54) COMPUTER METHOD AND SYSTEM FOR SEARCHING AND NAVIGATING PUBLISHED CONTENT ON A GLOBAL COMPUTER NETWORK

(75) Inventors: Thomas A. Gerace, Boston, MA (US); Russell G. Barbour, Natick, MA (US); Christopher Marstall, Cambridge, MA (US); Francois Gagnon, Arlington, MA (US)

(73) Assignee: SKYWORD INC., Boston, MA (US)

( * ) Notice: Subject to any disclaimer, the term of this patent is extended or adjusted under 35 U.S.C. 154(b) by 1847 days.

(21) Appl. No.: 11/593,864

(22) Filed: Nov. 7, 2006

(65) Prior Publication Data

US 2007/0118802 A1 May 24, 2007

Related U.S. Application Data

(63) Continuation-in-part of application No. 11/371,462, filed on Mar. 9, 2006, and a continuation-in-part of (Continued)

(51) Int. Cl.
*G06Q 10/00* (2012.01)
*G06Q 30/00* (2012.01)
(Continued)

(52) U.S. Cl.
CPC ........... *G06Q 10/10* (2013.01); *G06F 16/245* (2019.01); *G06F 16/248* (2019.01); (Continued)

(58) Field of Classification Search
CPC .................................. G06Q 30/0207–30/0277
See application file for complete search history.

(56) References Cited

U.S. PATENT DOCUMENTS

| | | | |
|---|---|---|---|
| 4,659,314 | A | 4/1987 | Weinblatt |
| 4,718,106 | A | 1/1988 | Weinblatt |

(Continued)

FOREIGN PATENT DOCUMENTS

| | | | |
|---|---|---|---|
| CA | 2 605 995 | A1 | 11/2006 |
| GB | 2390925 | | 1/2004 |

(Continued)

OTHER PUBLICATIONS

Wang et al., An Effective Content-based Recommendation Method for Web Browsing on Keyword Context Matching, Oct. 2006, Journal of Informatics & Electornics, vol. 1, No. 2, pp. 49-59 (Year: 2006).*

(Continued)

*Primary Examiner* — Naresh Vig
(74) *Attorney, Agent, or Firm* — Hamilton, Brook, Smith & Reynolds, P.C.

(57) ABSTRACT

A computer system for publishing content includes a categorization member, a rating module, a user profiling assembly and a suggested-reading engine. The categorization member enables an author-user and reader-users of an authored work to categorize content of the authored work using a fixed taxonomy, keywords, tags and/or keyword combinations. The rating module enables reader-users to rate authored works and makes a determination of quality of each authored work in the system. Rating includes reader-user response activity such as number of times the reader recommends, forwards or otherwise effectively promotes the authored work. The user profiling assembly measures words and word combinations used (written or read) by a user and generates therefrom a profile of the user. The suggested-reading engine is responsive to the rating module and provides a ranked list of suggested reading (authored works) for a user. The suggested reading is based on the user's (Continued)

ratings of authored works, respective relevance of authored works to the user and editorial promotion of certain articles/ authored works.

34 Claims, 23 Drawing Sheets

Related U.S. Application Data application No. 11/451,995, filed on Jun. 12, 2006, now Pat. No. 10,510,043.

(60) Provisional application No. 60/734,690, filed on Nov. 8, 2005.

(51) Int. Cl.

| | |
|---|---|
| ***G06Q 10/10*** | (2012.01) |
| ***G06Q 30/02*** | (2012.01) |
| ***G06F 16/9535*** | (2019.01) |
| ***G06F 16/245*** | (2019.01) |
| ***G06F 16/248*** | (2019.01) |

(52) U.S. Cl.

CPC ......... *G06F 16/9535* (2019.01); *G06Q 30/02* (2013.01); *G06Q 30/0204* (2013.01); *G06Q 30/0269* (2013.01); *G06Q 30/0273* (2013.01)

(56) References Cited

U.S. PATENT DOCUMENTS

| | | | | |
|---|---|---|---|---|
| 4,930,011 | A | 5/1990 | Kiewit | |
| 5,260,778 | A | 11/1993 | Kauffman et al. | |
| 5,446,919 | A | 8/1995 | Wilkins | |
| 5,504,675 | A | 4/1996 | Cragun et al. | |
| 5,515,098 | A | 5/1996 | Carles | |
| 5,636,346 | A | 6/1997 | Saxe | |
| 5,974,398 | A * | 10/1999 | Hanson et al. | 705/14.64 |
| 6,141,010 | A | 10/2000 | Hoyle | |
| 6,161,142 | A | 12/2000 | Wolfe et al. | |
| 6,175,831 | B1 | 1/2001 | Weinreich et al. | |
| 6,275,811 | B1 * | 8/2001 | Ginn | 705/10 |
| 6,285,987 | B1 | 9/2001 | Roth et al. | |
| 6,345,293 | B1 | 2/2002 | Chaddha | |
| 6,366,298 | B1 | 4/2002 | Haitsuka et al. | |
| 6,374,237 | B1 | 4/2002 | Reese | |
| 6,377,936 | B1 | 4/2002 | Henrick et al. | |
| 6,411,950 | B1 | 6/2002 | Moricz et al. | |
| 6,496,857 | B1 | 12/2002 | Dustin et al. | |
| 6,513,052 | B1 | 1/2003 | Binder | |
| 6,516,338 | B1 | 2/2003 | Landsman et al. | |
| 6,539,375 | B2 | 3/2003 | Kawasaki | |
| 6,571,234 | B1 | 5/2003 | Knight et al. | |
| 6,606,644 | B1 | 8/2003 | Ford et al. | |
| 6,628,314 | B1 | 9/2003 | Hoyle | |
| 6,631,360 | B1 | 10/2003 | Cook | |
| 6,654,725 | B1 | 11/2003 | Langheinrich et al. | |
| 6,687,737 | B2 | 2/2004 | Landsman et al. | |
| 6,725,203 | B1 | 4/2004 | Seet et al. | |
| 6,757,740 | B1 | 6/2004 | Parekh et al. | |
| 6,763,334 | B1 | 7/2004 | Matsumoto et al. | |
| 6,778,982 | B1 | 8/2004 | Knight et al. | |
| 6,785,659 | B1 | 8/2004 | Landsman et al. | |
| 6,804,659 | B1 | 10/2004 | Graham et al. | |
| 6,829,780 | B2 | 12/2004 | Kraft et al. | |
| 6,839,680 | B1 | 1/2005 | Liu et al. | |
| 6,845,396 | B1 | 1/2005 | Kanojia et al. | |
| 7,395,499 | B2 * | 7/2008 | Lane et al. | 715/243 |
| 7,614,081 | B2 | 11/2009 | Prohel et al. | |
| 7,797,345 | B1 | 9/2010 | Martino et al. | |
| 7,856,658 | B2 * | 12/2010 | James | G06F 16/958 726/6 |
| 2001/0047290 | A1 * | 11/2001 | Petras et al. | 705/10 |
| 2002/0059201 | A1 | 5/2002 | Work | |
| 2002/0147710 | A1 | 10/2002 | Hu | |
| 2002/0169782 | A1 | 11/2002 | Lehmann et al. | |
| 2003/0154248 | A1 | 8/2003 | Smith et al. | |
| 2004/0073482 | A1 | 4/2004 | Wiggins et al. | |
| 2004/0103024 | A1 | 5/2004 | Patel et al. | |
| 2004/0172324 | A1 | 9/2004 | Merriman et al. | |
| 2004/0172331 | A1 | 9/2004 | Merriman et al. | |
| 2004/0172332 | A1 | 9/2004 | Merriman et al. | |
| 2004/0215509 | A1 | 10/2004 | Perry | |
| 2004/0215515 | A1 | 10/2004 | Perry | |
| 2004/0260792 | A1 | 12/2004 | Speicher | |
| 2005/0021750 | A1 | 1/2005 | Abrams | |
| 2005/0022013 | A1 | 1/2005 | Schwenk | |
| 2005/0131762 | A1 | 6/2005 | Bharat et al. | |
| 2005/0131894 | A1 | 6/2005 | Vuong | |
| 2005/0171832 | A1 | 8/2005 | Hull et al. | |
| 2005/0201290 | A1 | 9/2005 | Vasudev et al. | |
| 2005/0203801 | A1 * | 9/2005 | Morgenstern et al. | 705/14 |
| 2005/0203809 | A1 | 9/2005 | Stone et al. | |
| 2006/0015521 | A1 * | 1/2006 | Howey | G06F 16/254 |
| 2006/0095281 | A1 | 5/2006 | Chickering et al. | |
| 2006/0143068 | A1 | 6/2006 | Calabria | |
| 2006/0200435 | A1 | 9/2006 | Flinn et al. | |
| 2006/0212355 | A1 | 9/2006 | Teague et al. | |
| 2006/0282328 | A1 | 12/2006 | Gerace et al. | |
| 2006/0287916 | A1 | 12/2006 | Starr et al. | |
| 2007/0043583 | A1 | 2/2007 | Davuleu et al. | |
| 2007/0061303 | A1 | 3/2007 | Ramer et al. | |
| 2007/0078898 | A1 * | 4/2007 | Hayashi et al. | 707/104.1 |
| 2008/0162260 | A1 | 7/2008 | Rohan et al. | |
| 2008/0168033 | A1 | 7/2008 | Ott et al. | |

FOREIGN PATENT DOCUMENTS

| | | |
|---|---|---|
| WO | WO 95/23371 | 8/1995 |
| WO | WO 01/80039 A2 | 10/2001 |
| WO | WO 03/038563 A2 | 5/2003 |
| WO | WO 2004/036476 A1 | 4/2004 |
| WO | WO 2005/006152 A2 | 1/2005 |
| WO | WO 2006/135920 A2 | 12/2006 |

OTHER PUBLICATIONS

Green, Heather. "Making Social Networks Profitable: Google's new approach could offer advertisers coveted online communities," *BusinessWeek*, Sep. 25, 2008 [retrieved on Sep. 30, 2008]. Retrieved from the Internet URL: http://www.businessweek.com/print/magazine/content/08_40/b4102050681705.htm.

Egan, R., "The Secrets of Real-Time Search Success," *iMedia Connection* [online], Feb. 9, 2010, [retrieved on Feb. 10, 2010]. Retrieved from the Internet URL: http://www.imediaconnection.com/printpage/printpage.aspx?id=25877.

Extended European Search Report, Application No. 06784855.6, dated May 4, 2010.

Extended European Search Report for EP Application No. 10172943.2-2221 dated Sep. 14, 2010.

Extended European Search Report for EP Application No. 10172232.0-2221 dated Sep. 14, 2010.

European Search Report for EP Application No. 10172943.2-2221 dated Jul. 5, 2011.

European Search Report for EP Application No. 10172232.0-2221 dated Jul. 5, 2011.

Office Action, Application No. CA 2,611,974; "Computer Method and Apparatus for Targeting Advertising", dated Feb. 18, 2015.

Hearst, M., "Design Recommendation for Hierarchical Faceted Search Interfaces," School of Information UC Berkeley, 2006.

XP002441767 [online] Retrieved from the Internet URL: http://www.archive.org/web/20051001143 606/http://www.youtube.com [retrieved on Oct. 1, 2005].

* cited by examiner

┌─────────────────────────────────────────────────────────────────────────┐
│                                                                    ╱─11 │
│  View▼ Publish▼ Connect▼  Communicate▼ My Content▼ My Profile▼ My Points▼│
│                 18 New    3 Messages                            05 375  │
│                                    Welcome, Tommy! Account Settings | Logout │
│  Search  Gather  ▼  for  Blogging    Go              April 16, 2005     │
├──────────────────────────────────────────┬──────────────────────────────┤
│ Publish An Article: Categorize (29)      │ Sponsored Links              │
│                                    Publish                              │
│ Lorem ipsum dolor sit amet, consectetuer │ More Than a Blog    [more]   │
│ adipiscing elit. Duis bibendum, quam a  ▸Article │ A revolutionary new way to │
│ euismod dignissim, est odio facilisis tortor,  Review │ publish your stuff on the web. │
│ eget eleifend orci ipsum tristique odio. Photo    │ www.squarespace.com │
│ ┌──────────■──────────┐              Audio/Podcasts │                    │
│                                      Files     │ Blogs for Young People [more]│
│ Step 1:    Step 2:      Step 3:                 │ Get a free blog and share your│
│ Create     Categorize   Viewing Options          │ adventures and life with the world!│
│ Select a category for your article.    ╱─42     │ www.tigblog.org              │
│ ┌──────────────────────────────────────┐         │ Make Money Blogging [more]   │
│ │ You've Selected News "International" Europe│   │ Learn How to Make Money      │
│ │ 1. First Level (Top)   2. Second Level │     │ With a Blog in This Crash Course.│
│ │ ┌──────────┐ ┌─┐ ┌──────────────┐ ┌─┐ │      │ SuccessBlog.biz              │
│ │ │ News>>   │ │ │ │ Late Breaking>>│ │ │      │                              │
│ │ │ Politics>>│ │ │ │ International>>│ │ │      │ Free Blogs at Blogster [more]│
├──┴──────────┴─┴─┴─┴──────────────┴─┴─┴─┴────────┴──────────────────────┤
│ Add Tags (Separated by commas)          ○ Suggested Tags                 │
│ Tags are descriptive words and phrases that work to  ⦿ My Recent Tags   │
│ index content and help Gather members find it. The                       │
│ separated by commas, in the box below. learn more  ┌─────────┐          │
│ ┌──────────────────────────────────────────┐       │ arts    │          │
│ │ technology, user interface, gadgets, remote controls,│ books   │      │
│ │ reviews                                  │       │ business│          │
│ └──────────────────────────────────────────┘       │ education│▼        │
│ ┌─────┐                                            └─────────┘          │
│ │NEXT │                              ╲─61          click tag to add      │
│ └─────┘                                                                  │
│ Add Tags (Separated by commas)                     ○ Suggested Tags      │
│ Tags are descriptive words and phrases that work to ⦿ My Recent Tags    │
│ index content and help Gather members find it. The                       │
│ separated by commas, in the box below. learn more                        │
│ ┌──────────────────────────────────────────┐       ┌─────────┐          │
│ │ technology, user interface, gadgets, remote controls,│ planning│      │
│ │ reviews                                  │       │ community│         │
│ └──────────────────────────────────────────┘       │ flagged content│   │
│ ┌─────┐                                            │ feature proposal│▼ │
│ │NEXT │                                            └─────────┘          │
│ └─────┘                                             click tag to add     │
│ Tag Suggestions         Current Tags (Separate tags with commas)         │
│ ┌──────────────┐ ┌─┐   ┌──────────────────────────────────────┐         │
│ │ people       │ │ │   │ technology, user interface, gadgets, remote controls,│ │
│ │ site comments│ │ │   │ reviews                              │         │
│ │ as seen on tv│ │ │   └──────────────────────────────────────┘         │
│ │ education    │ │▼│                                                     │
│ └──────────────┘ └─┘                                                     │
│ click tag to add                                                         │
└─────────────────────────────────────────────────────────────────────────┘

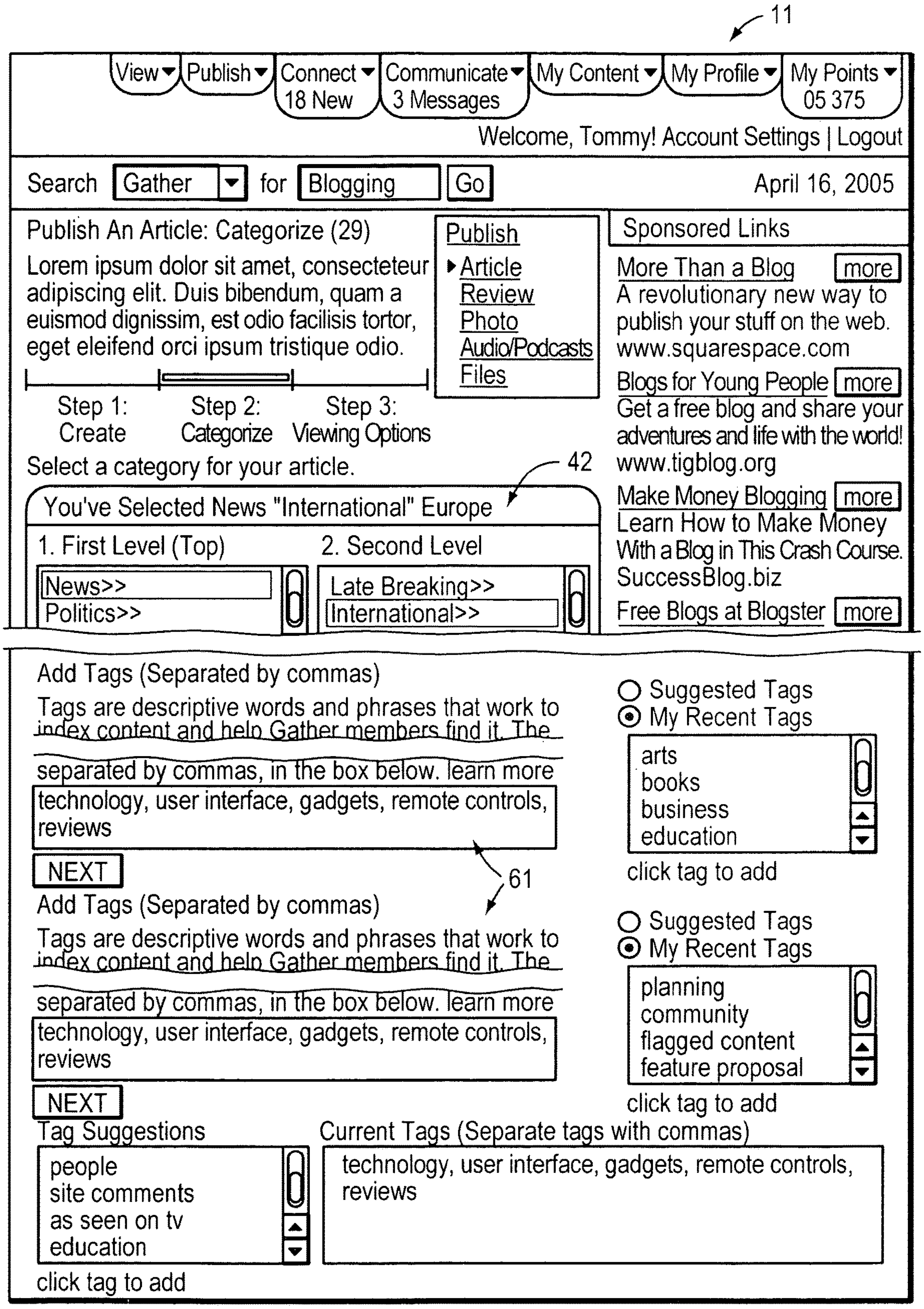

FIG. 3B

| View ▼ | Publish ▼ | Connect ▼ 18 New | Communicate ▼ 3 Messages | My Content ▼ | My Profile ▼ | My Points ▼ 05 375 |

Welcome, Tommy! Account Settings | Logout

Search [Gather ▼] for [Blogging] [Go]    April 8, 2005

⊞ Browse Categories

⊟ In My Neighborhood [edit]

" Boston, MA: No-laq roll-overs with graphical/CSS hybrid button

[Add More Regions >>]

⊟ Related Articles [edit]

" churchill: No-laq roll-overs with graphical/CSS hybrid button

[More Related Articles >>]

⊞ People Who Read This Also Read [edit]

⊟ Most Popular [edit]

⊞ By Keyword

⊟ By Category
" Science & Technology

[More >>]

⊞ Recently Read [edit]

Thomas' Home Page >> Publish >> Create Article >> Categorize >> Preview

This is the Name of Article One
March 28, 2005 7:02a ET

By UserName << [Tip]
Keywords: lacina, metus, luctus

Sponsored Links

More Than a Blog   [more]
A revolutionary new way to publish your stuff on the web.
www.squarespace.com

_59_

Author:          Christ Marstall
Article Name:    What I Did On My Summer Vacation Tip Guide:    50 Points      Average Tip
              250 Points     Good Tipper
              1800 Points    Best Tip Today Tip this Author
☐ I would like to tip this author anonymously.

Your Current Point Total:   65,236

Enter the number of points you would like to tip the author    [200]  Points

SUBMIT

Rate This Article

| ☆ | ☆ | ☆ | ☆ | ☆ | ☆ | ★ | ☆ | ☆ | ☆ |
| 1 | 2 | 3 | 4 | 5 | 6 | 7 | 8 | 9 | 10 |

www.state.com
Blogging   [more]
Powerful and easy to use. Includes 1 GB of space, domain, & email.
www.blogidentity.com Ads I've Seen Recently >>
Your Ads Here >>

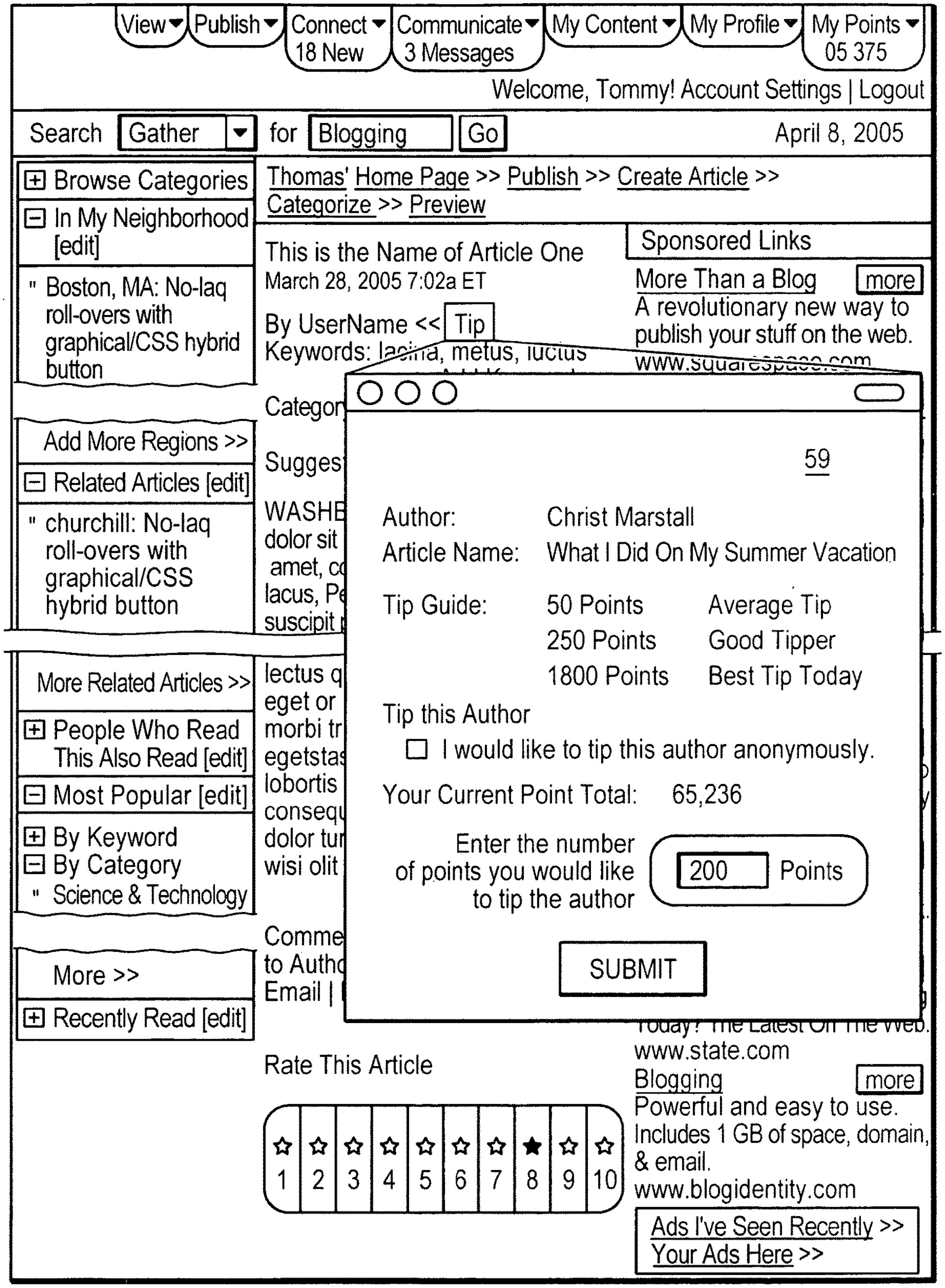

FIG. 4C-2

| View ▼ | Publish ▼ | Connect ▼ 18 New | Communicate ▼ 3 Messages | My Content ▼ | My Profile ▼ | My Points ▼ 05 375 |

Welcome, Tommy! Account Settings | Logout

Search [Gather ▼] for [Blogging] [Go]                    April 21, 2005

My Points: 65,235                        53

| Summary | Shop | Donate | Buy Points | Setting |

Point Transaction History [Last 30 Days ▼]

| Date | Transaction Type | Earned | Spent |
|---|---|---|---|
| 03/29/05 | Email | 20 | |
| 04/11/05 | Publish | 400 | |
| 04/14/05 | Donation | | (100) |
| 04/19/05 | Tip from Chris M. | 50 | |
| | Total | 370 | |
| | Previous Balance | 0 | |
| | Net Change | 370 | |
| | Current Points | 370 | |

— 88

How to Earn Points

Earn Points at G'
There are many ways that you can

Buying Power

Today, with 65,235 points you're able to redeem your points for some great merchandise with Gather or one of our trusted partners. Here's just a few of the many great things you can get.

>>$300 iTunes Gift Certificate from Apple

>>$300 Cash from American Express

>>Fuji 12-Speed Mountain Bike

Sponsored Links

More Than a Blog [more]
A revolutionary new way to publish your stuff on the web.
www.squarespace.com Blogs for Young People [more]
Get a free blog and share your adventures and life with the world!
www.tigblog.org Make Money Blogging [more]
Learn How to Make Money With a Blog in This Crash Course.
SuccessBlog.biz Free Blogs at Blogster [more]
Community blogging
2 minutes to your own blog.
www.blogster.com Start Your Free Blog [more]
Blog for free. Over 25 templates to choose from. Start your blog today
www.journalhome.com

---

We'll credit your account with 500 Gather points with your first Gather Target@Visa card purchase.

Earner of the Week

Tommy C. - 19,438 Points!
Somerville, MA

G: Tommy, what makes you such a good Gather Points Earner?

TC: "Working for product engineering at Apple Computer, I have a first-hand view of all of the new, secret projects me handily for that information - who knew? It couldn't have been easier!"

Special Offer
>>Donate 20,000 points to the Boston MFA and receive 2 tickets to visit 'Speed, Style, and Beauty' Cars from the Ralph Lauren Collection. A $100 Value!

Create Your Own Blog - It's Free Post, Publish, Get Feedback.
www.MyBlogSite.com Today's Blogs [more]
What are The Bloggers Saying Today? The Latest On The Web.
www.state.com Blogging [more]
Powerful and easy to use. Includes 1 GB of space, domain, & email.
www.blogidentity.com Ads I've Seen Recently >>
Your Ads Here >>

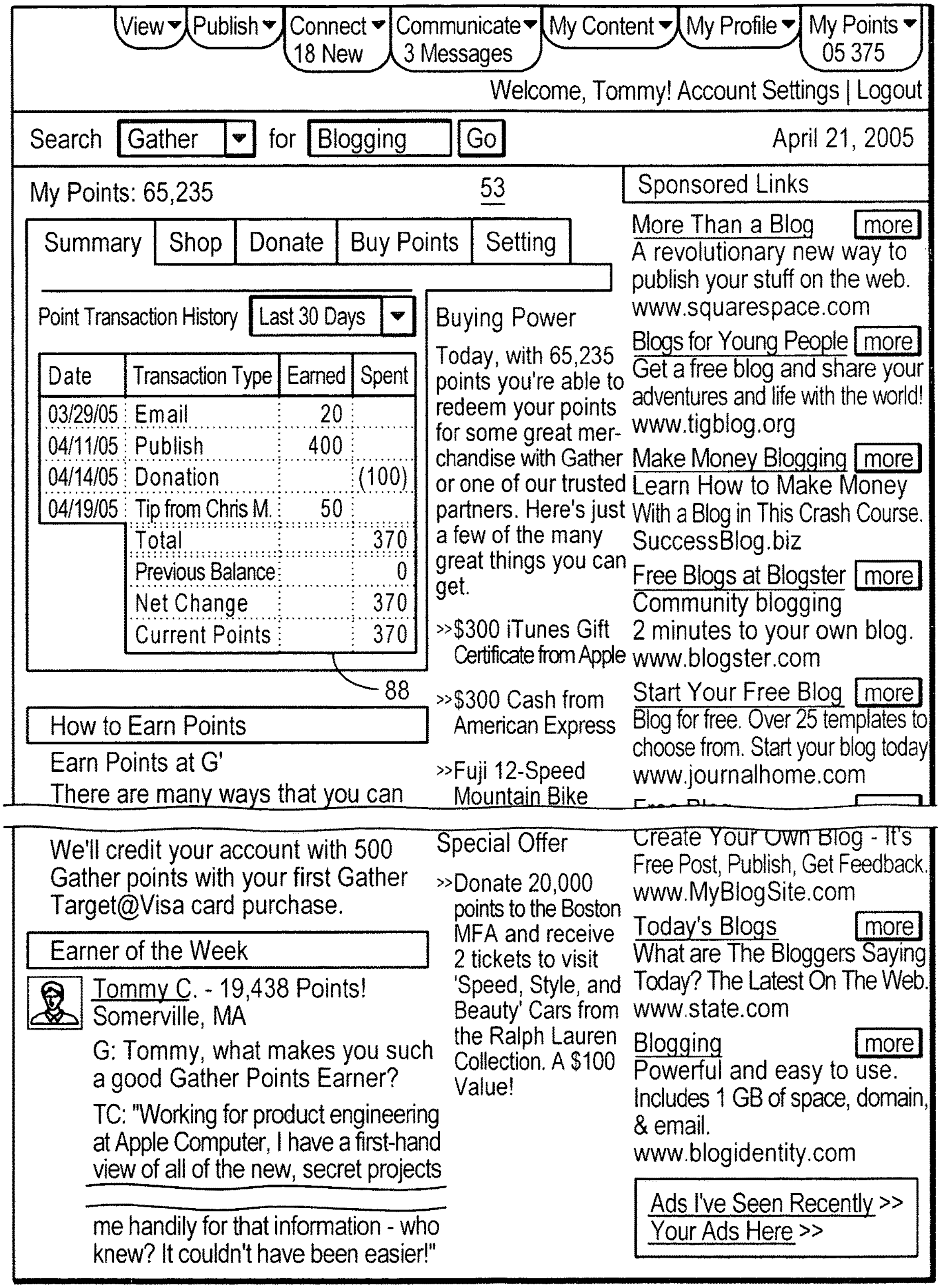

FIG. 6

COMPUTER METHOD AND SYSTEM FOR SEARCHING AND NAVIGATING PUBLISHED CONTENT ON A GLOBAL COMPUTER NETWORK

RELATED APPLICATIONS

This application claims the benefit of U.S. Provisional Application No. 60/734,690, filed Nov. 8, 2005. This application is also a Continuation-in-Part of U.S. application Ser. No. 11/371,462 entitled "User-Driven Media System in a Computer Network" filed on Mar. 9, 2006 and U.S. application Ser. No. 11/451,995, entitled "Computer Method and Apparatus for Targeting Advertising" filed on Jun. 12, 2006 now U.S. Pat. No. 10,510,043. The entire teachings of the foregoing applications are incorporated herein by reference.

BACKGROUND OF THE INVENTION

Today, users can publish content on blog, podcasting, and vlog systems at low or no costs. Readers of this content, however, have a difficult time (1) finding good content on any individual topic, (2) identifying experts writing online, (3) knowing when a content element or expert is more or less respected than another, (4) identifying when content on a topic has been updated, (5) comparing different opinions on a topic, (6) sharing their reading information with other users, and (6) identifying new content that might be of interest, by someone else publishing online.

SUMMARY OF THE INVENTION

The present invention addresses the shortcomings of the prior art.

Applicants have created a computer system for publishing content where multiple users can publish content (text, photography, video, audio, multimedia and the like and referred to generally as "authored work") on the internet, making that content available to the general public, a defined group or groups of users, or to specific individuals and where the publisher of content receives fees for the content they have published. The invention system also allows authors who are publishing elsewhere to post their content on the invention system as well for additional exposure.

The following features are provided in a preferred embodiment of the invention.

The invention system enables a user to categorize content, when posted, using key words/phrases, e.g., against a fixed taxonomy or taxonomies, against available tags, or against both. The system enables others to re-categorize the content (authored work), suggests new/alternative categories for the work or adds new categories for the work. In one embodiment, re-categorization or additional categorization must be suggested X number of times by readers before an authored work is newly categorized. The invention system displays an authored work with its user-specified categorization and users can select (click on) any level of that categorization to see other authored words similarly categorized.

Accordingly, the system categorizes authored works by key word/words or key phrase/phrases and users can search by or navigate by these keywords/phrases. The system enables a user who bookmarks an authored work or forwards an authored work to add his own keywords/phrases to make authored works easier to find in the future. Further embodiments enable users to add keywords simply to benefit the community. The system adds all of these keywords as meta-data to the authored work and utilizes them as navigational elements. The system may display the keywords in rank order. A default rank is given to author keywords/phrases. The system ranks the author keywords in the same list as reader keywords when presented to other readers. In some embodiments, clicking on an authored work keyword leads to a search result for that keyword. The system lists other keywords appearing with that keyword in the search results and lets the user narrow his search by selecting or otherwise indicating one or more of the other keywords. The system may list other keywords appearing with that keyword in the search results and lets the user narrow his search by filtering those suggestions out of the search.

In other embodiments, the system enables the author to classify the subject content (authored work) according to the geography for whom it might be relevant. The geography can represent legal or cultural boundaries (e.g. "Boston, Boston Area, New England, USA, Entire World") and/or distance from a point. The system provides to an author user lists of potential geographies based on his hometown, current location, or areas of frequent travel.

One embodiment enables the author to classify the authored work according to the demographics of the audience for whom it might be relevant. Similarly, the system enables the author to classify content "for mature audiences" including defining what characteristics (e.g., language, sexual content, violence). Reader/users can opt not to see mature content classified as "for mature audiences". Further the feature allows the system to enable users to search to find only mature content.

In some embodiments, the system allows the author to choose to make each content item available to everyone, only system members, specific groups, or specific individuals.

In various embodiments, the quality of an authored work is determined by the community of users. The invention system provides a rating system, where readers of an authored work rate that work (see rating system) for quality and the average rating is applied to the work. The rating score includes reader recommendations to others effectively promoting the authored work. An authored works must be rated a certain number of times before the rating is considered valid. The system normalizes ratings based on the population of the community or the general population of the nation/world. The system assigns to authors the average rating of their authored works site wide. The system may assign to authors ratings within a topic and within a keyword, key phrase or keyword combination based on the average rating of their works.

In some embodiments, quality is determined by experts in addition to or instead of community ratings. These experts are identified by the community rating system as the top X writers on any given category and/or within any keyword, key phrase or keyword combination. (NOTE: X may be an absolute number or a fraction of all authors on a topic or all users of the site). In one embodiment, a user must have X number of authored works written before being considered as an expert, or a user must have works rated by X number of people before being considered an expert, or a user must have X number of subscribers before being considered an expert. And/or a user must remain in the top X percent of most popular writers on a topic to be considered an expert in the system.

In other embodiments, these experts are identified by the community rating system as general experts, site-wide, using site-wide ratings. These experts may be hand-picked by an editorial staff. Further, "expert ratings" are created by taking the ratings of these experts and recording and/or displaying them separately from those of the community. Embodiments may identify these experts to the community and/or not identify these experts. In some embodiments, these experts are identified to themselves, and in other embodiments they are not.

In other embodiments, the system determines quality of an authored work by how many readers compensate (tip) the author. Where a piece (authored work) is offered for sale, the system determines quality of a piece by how many readers pay to read the piece.

The system may determine quality of an authored work by any combination of the above factors, which may be weighted differently one from another.

In accordance with another feature, the invention system measures popularity of an authored work by how many times the authored work is read, bookmarked, recommended, forwarded, commented on and/or subscribed to. Some weighted combination of any of these factors may be used to determine popularity. The system may rank popularity sitewide, within categories and or within keyword combinations (including keywords and key phrases). The system may rank authored works and authors by popularity within categories or within keywords/keyword combinations based on their relationship to other authored works. Popularity of an author may be determined by his average popularity over all authored works. This measure of author popularity may be used to determine expert status as described above.

In accordance with another feature, the system observes a user's behavior and profiles that user based on his behavior. This is accomplished by the system measuring what words, and word combinations a user writes (or speaks, based on transcripts of recordings). The system may measure what words and word combinations a user reads (or hears based on transcripts of recordings). The system may store these reading and writing profiles separately or together. The system may weight words/combinations differently or weightings may be re-factored based on how frequently the words/combinations are written/read and/or how recently the words/combinations have been written/read. The system may weight the words/combinations differently or refactor them when a user bookmarks, forwards, emails, or recommends an authored work that he is reading or tips or subscribes to an author that he is reading. In some embodiments, certain words (e.g. he, she, a, the) are not recorded in the profile.

In some embodiments, individuals, either editors or experts as defined above, may promote authored works as particularly unique, interesting, timely, or novel. This feature may be done by multiple people or just one. This feature may be done at variable levels by each person (e.g. each authored work starts at 0 and can be increased to as high as 100). The total promotion of an authored work may be measured by the sum of its promoters' activities. The total promotion of an authored work may be measured by the average of its promoters' activities.

In accordance with another aspect of the present invention, the system employs a suggested reading engine or member. The suggested reading engine uses an algorithm and at least one of these factors: community ranking, expert ranking, individual relevance ranking, and editorial promotion to create a ranked list of suggested articles (authored works) for a reader user. The algorithm may contain weighting that is determined from time to time (e.g. Weighting A*community ranking+Weighting B*Expert Ranking+ Weighting C*individual relevance ranking+Weighting D*popularity+Weighting E*Editorial Promotion). Alternatively, the weighting may be determined automatically by the system based on testing different weightings and measuring how likely the user is to respond to system generated suggestions.

For a given reader-user, the ranked list of authored works may be provided with respect to all authored works on a site, or just those works within one taxonomical/tag category, keyword or keyword combination or group, or for a specific author or other subset of content as selected by the reader-user. The average of these rankings for all of an author's works is assigned to the author (the author's rank) and the system further determines the appropriateness of each author for each potential reader (the author's appropriateness). In some embodiments, a given author's average rankings are assigned to each new article by this author. The system then displays to readers this author's content based on the average rank and the author's appropriateness to the reader. These average/initial assignments are replaced by data for the actual authored work as soon as that work has sufficient rankings of its own to be statistically significant. For new content (authored works) published by new authors with no history, the system takes the average rankings of everyone to whom that author is related/connected and assigns that ranking to the author. Or the system assigns a default ranking to that author until sufficient data is gathered to create an author average ranking set.

The suggestion engine in some embodiments suggests authored works to a user based on his profile's similarity to other reader-users. The suggestion engine suggests to a subject reader-user the authored works that these similar users have viewed. Indicators, such as "people like you also liked . . . " may be used/displayed. The users with similar profiles are identified one to another as sharing content interests.

In some embodiments, a user is alerted to any article achieving a total rank above a set limit. The alert is delivered by email, pager, or site notification.

In accordance with other aspects of the present invention, the invention system is combined with an author compensation mechanism, where author rewards are tied to (a function of) quality, popularity, or advertising revenue derived from the content (authored works) they publish.

In some embodiments, editors promoting content (authored works) may override the rating system with an authored work or set of works, for example an authored work so important that all users must see it. The system may display these works at the top of the list automatically, or group these works under a single header. One embodiment allows these works to remain visible either until replaced or until some period of time expires (threshold met).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 3*a*-3*d* are screen views of the user interface supporting the composing, categorizing and tagging operations of the present invention.

FIGS. 4*c*-1 and 4*c*-2 are screen views of the user interface supporting the reader rating and tipping operations of the present invention.

FIG. 6 is a schematic illustration of the user interface including a summary of points earned and spent by a given user.

DETAILED DESCRIPTION OF THE INVENTION

A description of preferred embodiments of the invention follows.

Applicants recognize that the global computer network publications area is rife with potential visibility, readership and authorship. As such, Applicants pose a desire to harness this media and the user interactivity of the global computer network environment into a user driven media company (or "system" generally). This media system 100 requires that users do not just consume content as they do in traditional media, but they also create, edit, organize, and peer rate the content. It also requires the creation of an underlying, financially sound, contributor (frequent writer) compensation program.

Figure 1:
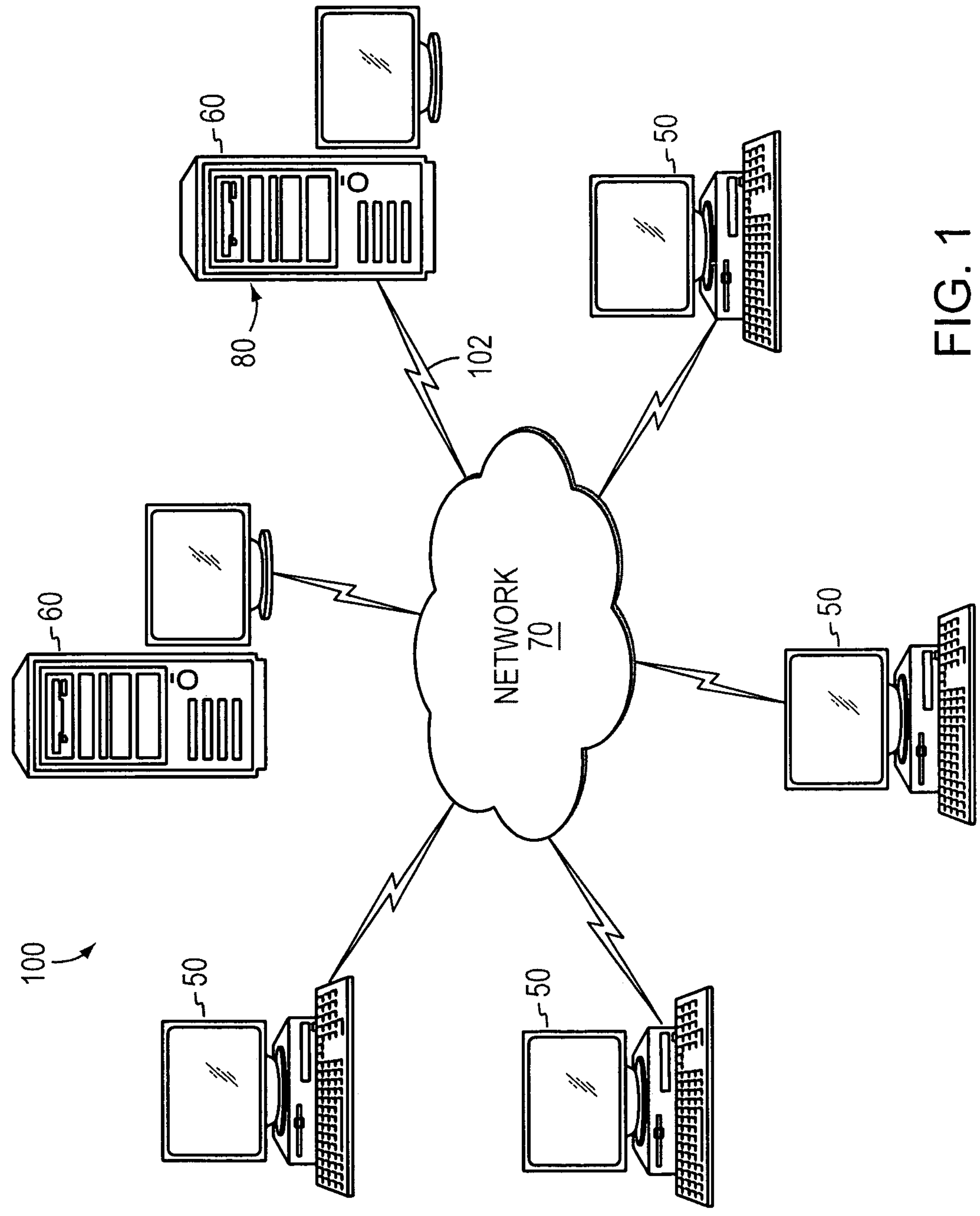
FIG. 1 is a schematic diagram of a global computer network environment in which embodiments of the present invention operate.

Illustrated in FIG. 1 is a global computer network environment in which embodiments of the present invention are implemented. Client computer(s) 50 and server computer(s) 60 provide processing, storage, and input/output devices executing application programs and the like. Client computer(s) 50 can also be linked through communications network 70 to other computing devices, including other client computer(s) 50 and server computer(s) 60. Communications network 70 can be part of the Internet, a worldwide collection of computers, networks, and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. Other global computer networks 70 are suitable.

Figure 2A:
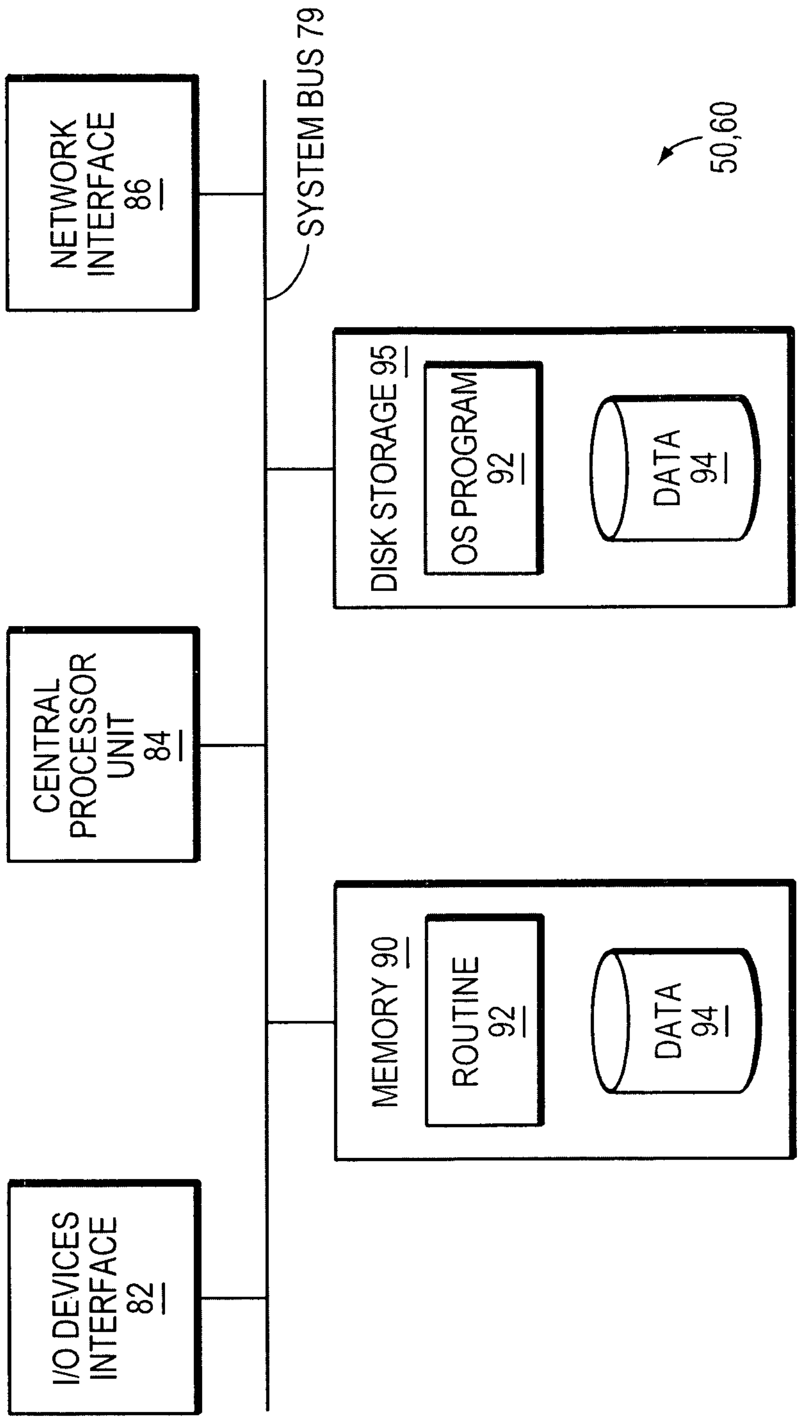
FIG. 2*a* is a block diagram of the different components of a computer node in the network of FIG. 1 embodying the present invention.

FIG. 2*a* is a diagram of the internal structure of a computer 50, 60 in the network of FIG. 1 that implements the present invention. The computer 50, 60 contains system bus 79, where a bus is a set of hardware lines used for data transfer among the components of a computer. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., displays, printers, speakers, etc.) to the computer. Network interface 86 allows the computer to connect to various other devices attached to a network (e.g., network 70 of FIG. 1). Memory 90 provides volatile storage for computer software instructions used to implement an embodiment of the present invention (e.g., Program Routines 92 and Data 94). Disk storage 95 provides non-volatile storage for computer software instructions and data used to implement an embodiment of the present invention. Central processor unit 84 is also attached to system bus 79 and provides for the execution of computer instructions.

In one embodiment, computer program product 80, including a computer readable medium (e.g., a removable storage medium such as one or more DVD-ROM's, CD-ROM's, diskettes, tapes, etc.) provides at least a portion of the present invention software instructions. Computer program product 80 can be installed by any suitable software installation procedure, as is well known in the art. In another embodiment, at least a portion of the software instructions may also be downloaded over a wireless connection. Computer program propagated signal product 102 embodied on a propagated signal on a propagation medium (e.g., a radio wave, an infrared wave, a laser wave, a sound wave, or an electrical wave propagated over a global network such as the Internet, or other networks) provides at least a portion of the present invention software instructions.

In alternate embodiments, the propagated signal 102 is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network. In another embodiment, the computer readable medium of computer program product 80 is a propagation medium that the computer system 10 may receive and read, such as by receiving the propagation medium and identifying a propagated signal embodied in the propagation medium, as described above for computer program propagated signal product 102.

In one embodiment, software instructions 92 executed on client computer 50 (the user's desktop machine) includes code for (1) publishing, (2) accessing content through searching, sorting and classifying information, (3) rating and ranking authored works and authors, (4) making reading suggestions to users and (5) profiling users.

FIGS. 2*b*-2*e* illustrate the corresponding computer software code 92 executed on a server computer 60. Server 60 code provides a Home Page 21 of the invention system 100 (i.e., user-driven media company Website). At the Home Page 21, the operations of General Information/Help 23, Search 25, View 27, Publish 11, Connect 31, Communicate 33, My Content 35, My Profile 37 and various accounting 39, 41 are provided.

Through registration process 45 (FIG. 2*c*), a user becomes a member to the invention Website/company (or registered user of the invention system 100). My Profile 37 is a set of aspects and settings that results from the registration process 45 and subsequent user activity/system 100 use. In one embodiment, My Profile 37 includes (i) general information, (ii) demographic information, (iii) school/college information, (iv) indications of hobbies, entertainment and TV/media/likes/interests, (v) personal biographical data, (vi) political affiliation, (vii) other affiliations, (viii) companies and (ix) photos, for example. Other categories of information are suitable. Advertiser users (business affiliates) use a different process 47 (FIG. 2*b*) to register with the invention system 100.

Tables Ia.-Ig. are example data sets supporting the user registration 45 process and My Profile 37 in a preferred embodiment. Other data sets and structures are suitable; further examples are described throughout the parent patent applications by assignee and incorporated herein by reference.

TABLE 1a

Registration
Aside from requesting the user to enter some profile information, the following are fulfilled for the registration process.

| Feature | Description |
|---|---|
| User name | The registering member enters the desired name he wants for his home page (name to be known as). The system recommends one based on the information entered (e.g., first and last name). |
| Must have email address | The member registering must already have an active email address. This email address will be confirmed by the system during the subscription process. |
| Decode image | The registering process asks the user to decode an image (known technique) or perform a similar method to prevent automated agents from establishing accounts. |

TABLE 1b

About me
The system provides members the ability to publish information about themselves. There are two type of profile information: basic and extended. The basic profile is preferably always public to every one where the extended one can be customized. The member can however specify if his basic profile should be shown to non-members (default is not to).

| Feature | Description |
|---|---|
| Two types of information | There are two types of information: basic and extended. |
| Basic profile always public. | Most of the information in the basic profile is always public (to the world). However, the member can elect to have his last initial displayed instead of full surname spelling. Likewise the member may elect a geographical locality (Greater Boston) to be displayed instead of city, state, zip and country. |
| Extended profile blocks | A member's extended profile is divided in blocks of information. One example of extended profile information is income level of the member. |
| Set profile block access privileges. | The member can set who can see each block profile block. By default, profile blocks are public. |
| Any profile information. | While system 100 provides already determined profile categories (e.g. "favorite films"), the user is able to enter extra information that is not already offered by system 100 (e.g. favorite sport celebrity). |

TABLE 1c

Connection management
Members are able to build a social network of friends, family members and coworker.

| Feature | Description |
|---|---|
| Three connection classes | One embodiment of the system 100 provides three connection classes:<br>Friend connection<br>Family connection<br>Work connection |
| Connection classes distinct | Friends connection includes direct and indirect connections of a "friends" class (similarly for work and family connections). So members may be indirectly connected within a common class. |
| Connections are reflexive | If person B is person A's connection then person A is person B's connection too. If person B is NOT person A's connection, then person A is not person B's connection either. |
| Connection invitation | Request for a connection between two members is made by one member sending a connection invitation to another member (or non member). |
| Connection acceptance | New connection must be accepted by invited parties to the connection. When accepting, the invited party has the option to "also subscribe to this (the inviting) member . . . ". |
| Invite non members | A member is able to send an invitation to a non member. If the invitation was sent to a non-system member (invitee), the invitee is able to join system 100. Invitations may optionally also contain a connection request. Note that the requirement "connection acceptance" must be satisfied. |
| View "who's online" | The member is able to know who among his connection is currently online. User can control his presence knowledge per friend class. |
| Show prior invitations after registration | Say that a person has 2 email addresses, one which he rarely checks. Let's also assume that five different members sent him registration invitation to his "less watched" address and one to the one he monitors more. After the registration |

TABLE 1c-continued

| Connection management<br>Members are able to build a social network of friends, family members and coworker. | |
|---|---|
| Feature | Description |
| | process 45 (where he entered his two email addresses), the system 100 automatically creates six connections requests with other members. |
| Deleted connections | A user can delete a connection at any time |

TABLE 1d

| External contact<br>The system 100 provides the user the ability to enter contact information of people that are NOT system members. | |
|---|---|
| Feature | Description |
| External contact are private | A member's external contact information must be private at all time. No one but the member can see this information |
| Easily send invitation to external contact | A member must be able to easily send an invitation to an external contact. |
| Ability to import/ export/sync | Member must be able to import/export/sync his contact list. This feature mimics plaxo or similar. |
| Support mailing lists | The member can create mailing lists. The number of email in the mailing list has a limit which is customizable in our system (set by the system administrator) |

When a member sees another member's profile information, the system 100 shows him if he is connected to that member and how he is connected to this member by showing the shortest connection path from him to the other member and for each connection class. The system 100 preferably shows multiple paths of network relation, up to three levels or degrees of separation. Me>User 1>User 2>You. A subject user sees his closest connection. Beyond three levels, the system 100 indicates that the subject user is not closely connected in one embodiment. The number of people connected between a given user and a subject target person (including the target person) is termed the 'degrees of separation' with respect to the user.

TABLE 1e

| System to confirm email addresses<br>The system makes a distinction between confirmed email addresses and unconfirmed ones. | |
|---|---|
| Feature | Description |
| Login with any confirmed email. | Any confirmed email addresses can be used to login to the system site 60 |
| Lookup unconfirmed email | Confirmed email addresses can only be used to lookup a member. The system must warn user when attempting to use it (such as trying to send an email to an unconfirmed email address) |
| Steal unconfirmed emails | If user A has an unconfirmed email address of a@a.com and users B confirms the email a@a.com, then the system 100 removes this email from A's list of unconfirmed email addresses. |
| Unconfirmed emails flagged | Any email that is unconfirmed is flagged as such. |

TABLE 1f

| A "Group" is a place where content (authored works) 29 can be published and group members notified when a new publication occurs or when someone posts a comment on an article that is part of the group. Groups allow their members to have a common location where they can communicate.<br>The group owner can determine if public and visible groups accept open applications from unrelated system members. | |
|---|---|
| Feature | Description |
| Content in Groups | Articles can be published to Groups. The article will then be accessible to all Group members. Note that when a Group member publishes an article, the article appears on both in the member's page and in the Group. |
| Group content searchable | Group content is searchable but depends on access privileges. A member who does not have read privileges on the Group cannot search its content. |
| Group created by members. | Any member can create a new Group. |
| Creator is Group's owner | The member that created the Group is the default Group owner. |
| Some Group members can invite others. | Some Group members can send invitations to other members to join the Group. |
| Invite non-members | Some Group members can also send an invitation to a non member in which case the person would need to register and would be automatically added to the Group. Multiple members may invite the same person. All invited |

TABLE 1f-continued

A "Group" is a place where content (authored works) 29 can be published and group members notified when a new publication occurs or when someone posts a comment on an article that is part of the group. Groups allow their members to have a common location where they can communicate.
The group owner can determine if public and visible groups accept open applications from unrelated system members.

| Feature | Description |
| --- | --- |
| | connections should be filled once the person actually joins. |
| Transfer of ownership | The Group owner can also transfer ownership to another Group member. |
| Subscribe/unsubscribe | A member can subscribe to a Group. Anyone can subscribe to a group that they have access to at least some articles in. A Group member can also unsubscribe from a Group at any time. |
| Members public within the Group | Every Group member can see every other member of the Group. |
| Chat capability | Members of a Group have the ability to chat. The conversation is recorded by the system 100 and used to profile the members. |
| Groups have profiles | Groups have profile information (name, description, thumbnail, keywords, taxonomy, founding date, number of members, scheduling tools, archive/history, photos, shared group links, who is online, list of recently active members (reader or writer)), current owner, etc. |
| Group can be moderated/ unmoderated | Moderators control what is published in the Group. There can be more than one moderator, and only one of them must approve an article for it to be published in the Group. In an unmoderated Group, member publication is automatically published in the Group. Moderators are specified by the Group owner. |
| Owner can remove members | The Group owner can remove a member from the Group. |

Grouping Permission Matrix

| Privilege | Who can be granted it (by grouping owner) | Group Default | Personal List Default |
| --- | --- | --- | --- |
| Create grouping | Public | Public | Public |
| Read Grouping articles | Public, All grouping members, individual grouping members | Public | All members |
| Post Grouping Articles | Public, individual grouping members, owner only | Public | Owner only |
| Delete Grouping Articles | Public, individual grouping members, owner only | Owner only | Owner only |
| Invite Members to Grouping | Public, individual grouping members, owner only | Owner only | Owner Only |
| See Grouping's Name/Profile | Public, all grouping members, owner only | Public | Owner Only |
| See Groupings members | Public, all grouping members, owner only | Public | Owner Only |
| Moderate submitted articles | Individual grouping member, all grouping members, owner only | Owner only | N/A |
| Reassign grouping owner | Owner only | Owner only | N/A |
| Administer grouping (all granting privileges) | Owner only | Owner Only | N/A |
| Remove member | Owner only, Administrator | Owner Only | Owner Only |
| Join grouping (w/o moderation) | Public | Public | N/A |

TABLE 1g

Organizations (optional embodiment)
Organizations are a special kind of membership but with fewer privileges.

| Feature | Description |
| --- | --- |
| Subset of privileges | Organizations have all the privileges regular members have except the following:<br>Cannot have connections<br>Cannot subscribe to content/members<br>Do not have an extended profile<br>All content is public to everyone. |
| Special profile | Organizations have a different profile (with different information) than regular members. |
| Remunerated | The system 100 can remunerate organizations for their publications. This remuneration can be either in points or cash. |
| Special content type | Organizations have a special format for their content structure. |

Further, the system 100 profiles the known user based on material he writes and reads, what he clicks on (group, article, etc. . . . ), the query he enters and the ads he clicks, etc. . . . This profile information is used to better target the known user with advertisement and authored works by others. The system 100 deduces demographic information (city, state, etc.) from a user's IP address, the type of article the user reads or search query he enters. In addition, known users can browse all other members' profiles 37. They can browse only the members' public profile information and the members' articles/connections/groups/taxonomies that are flagged as public.

In one embodiment, system 100 identifies to a user other users with similar profiles using the profile data discussed above. Various data structures or data stores (known in the art) of member profile data may be employed to support this feature.

In a preferred embodiment, system 100 measures words and word combinations that each user writes, speaks (based on transcripts of recordings) and reads (or hears based on transcripts of recordings). The word and word combinations have respective weights based on frequency of being written/read and recency of being written/read. System 100 may weight or refactor a word or word combination in an authored work (article) based on a user bookmarking, forwarding, e-mailing or recommending the authored work that he is reading or based on a user tipping (paying a gratuity) or subscribing to the author of the authored work.

Information about known users is preferably kept in the system 100 for a given amount of time (in days). If the known user does not visit the invention website 60 within this period of time, any profiling information kept about this user is discarded and the next time this user accesses the website he will be seen as an unknown user.

Figure 2B:
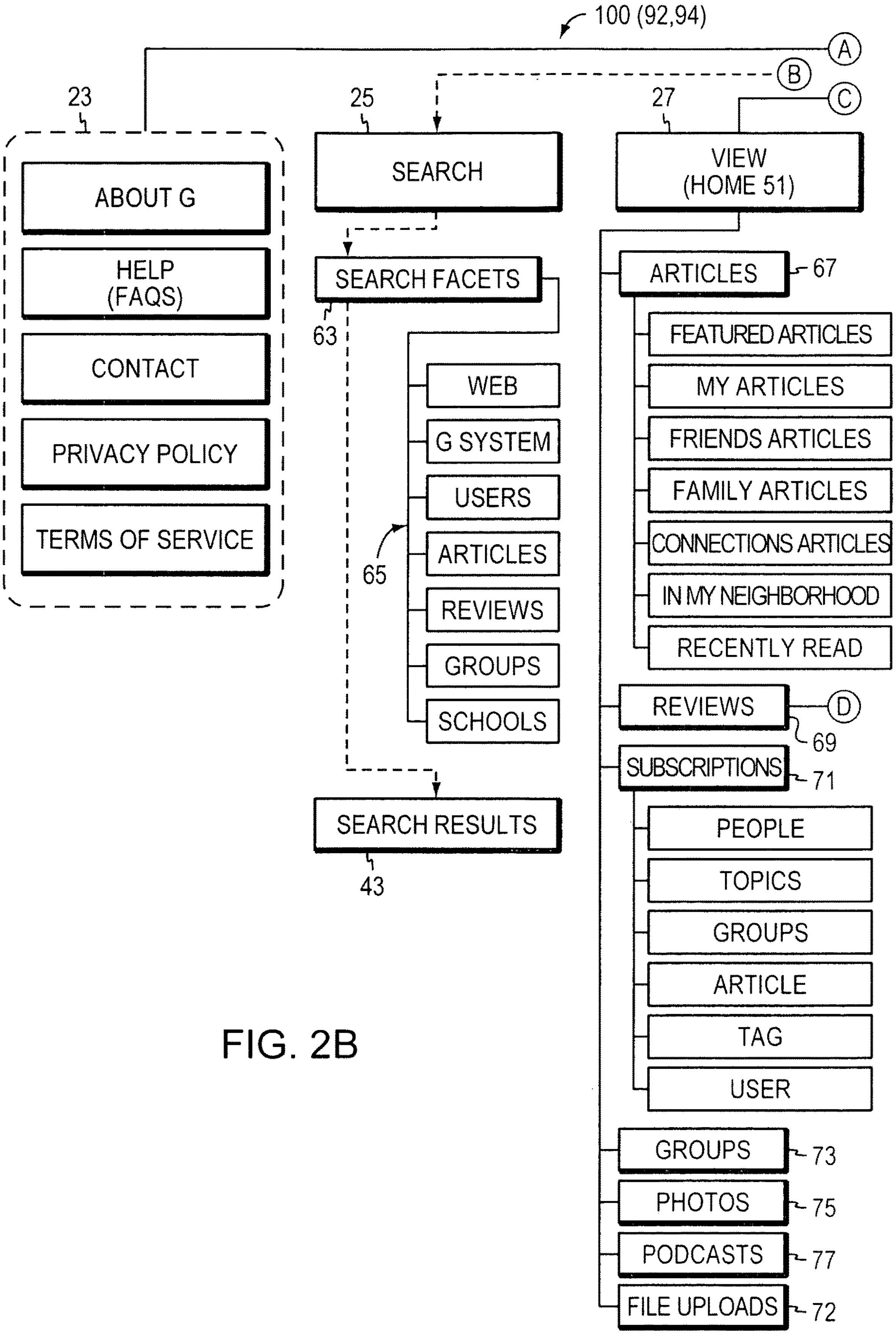
FIG. 2*b*-2*e* are flow diagrams of a website hosted by a server computer in a preferred embodiment of the present invention.

Referring to FIG. 2*b*, General Information 23 includes website company general information, website company contact information, site help, privacy and other policies and terms of service.

Figure 4A:
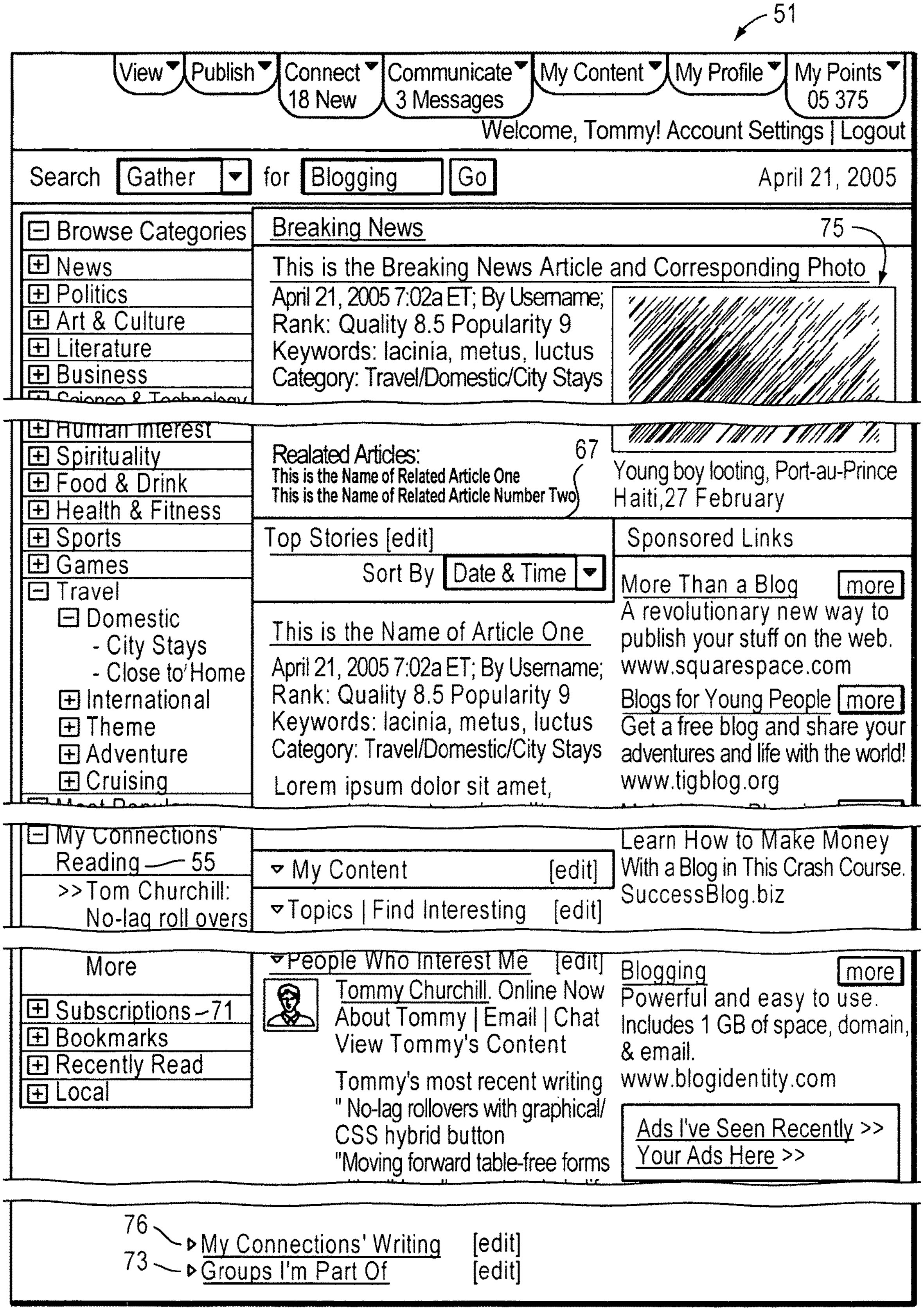
FIGS. 4*a* and 4*b* are illustrations of the reader interface, including a list of content prioritized based on the reader's expressed interests, the relationships that reader has with various writers and the recency and quality of the materials being presented.
Figure 4B:
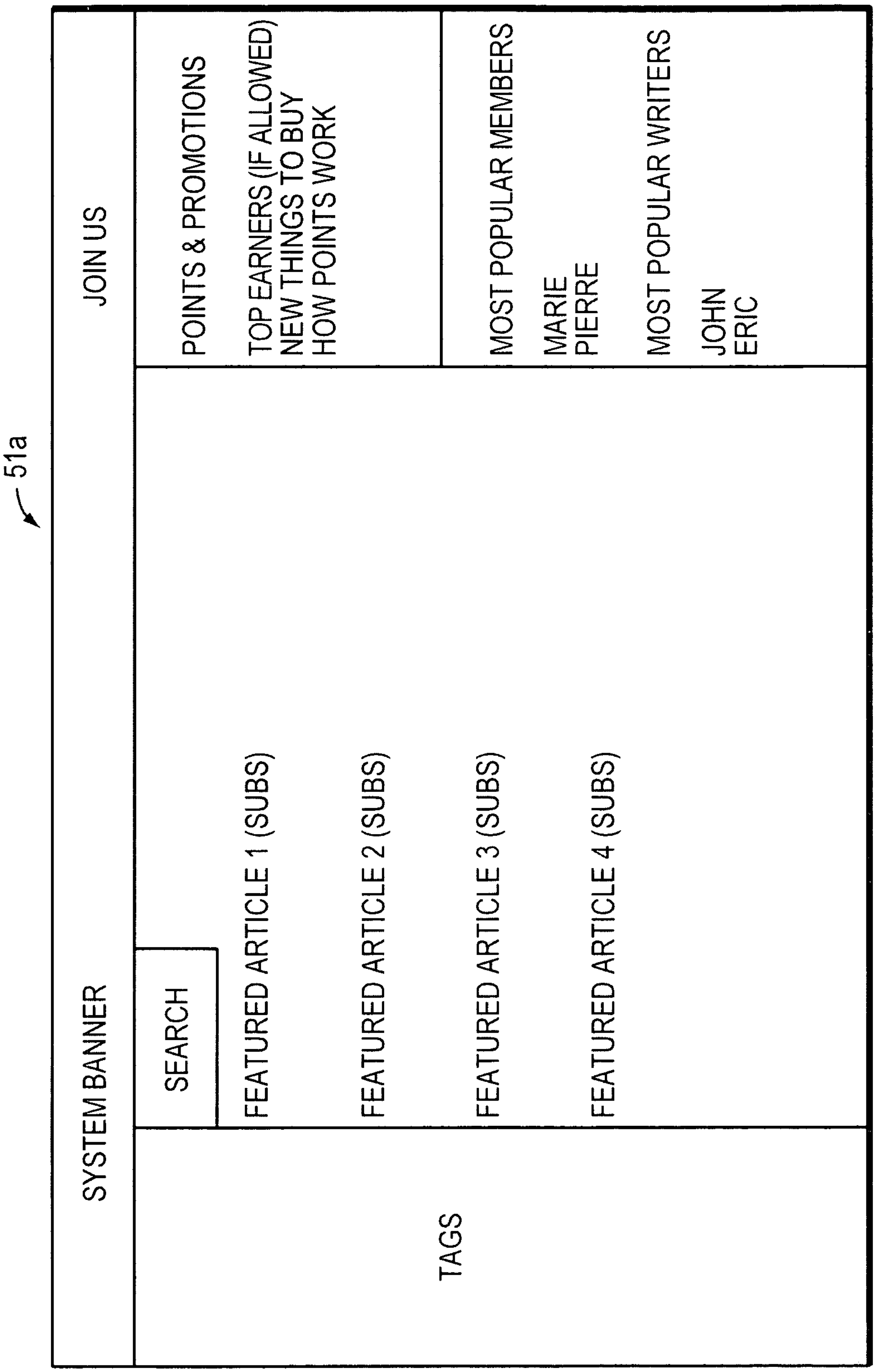
Figures 1, 4C:
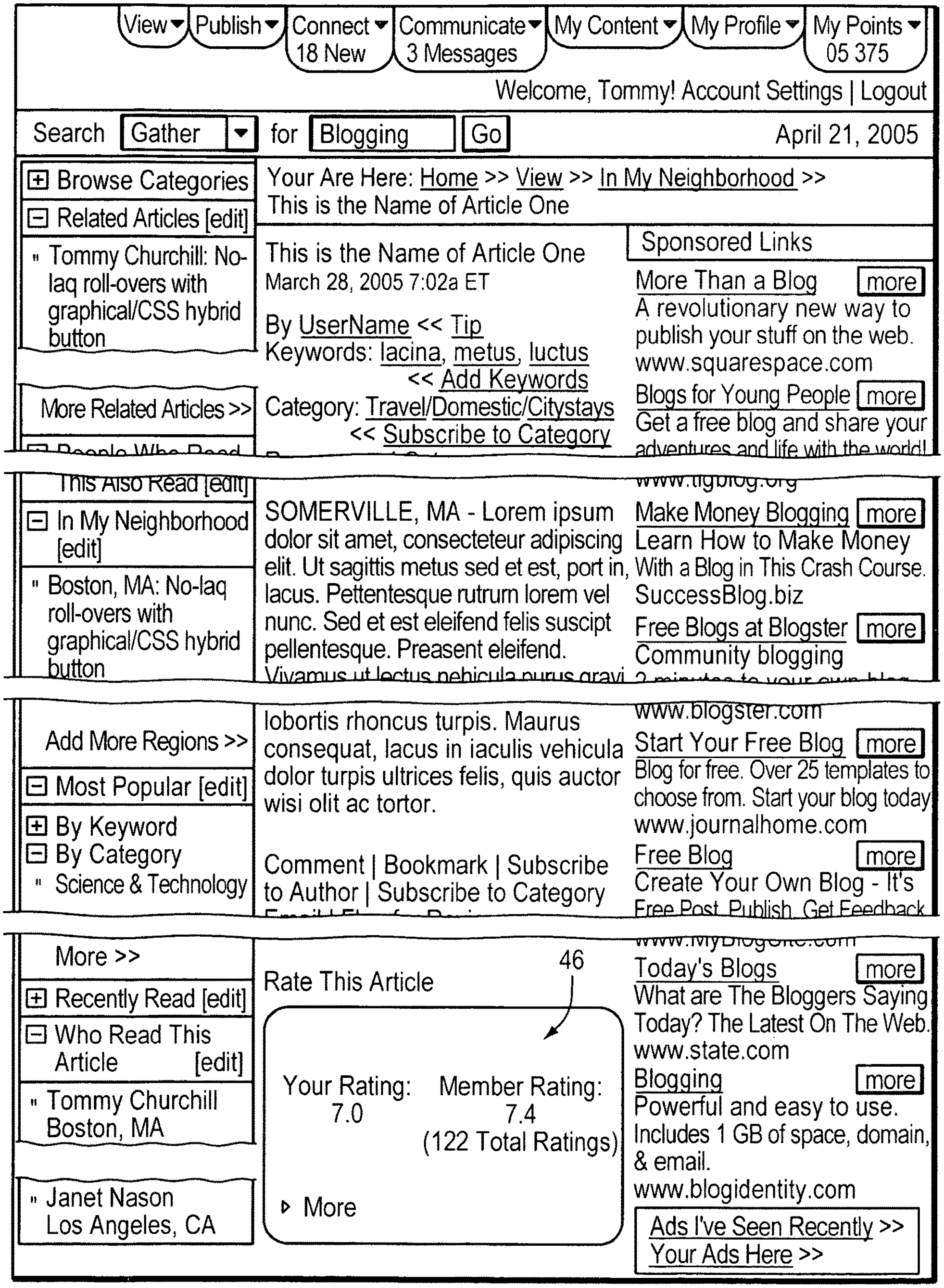
Figure 4D:
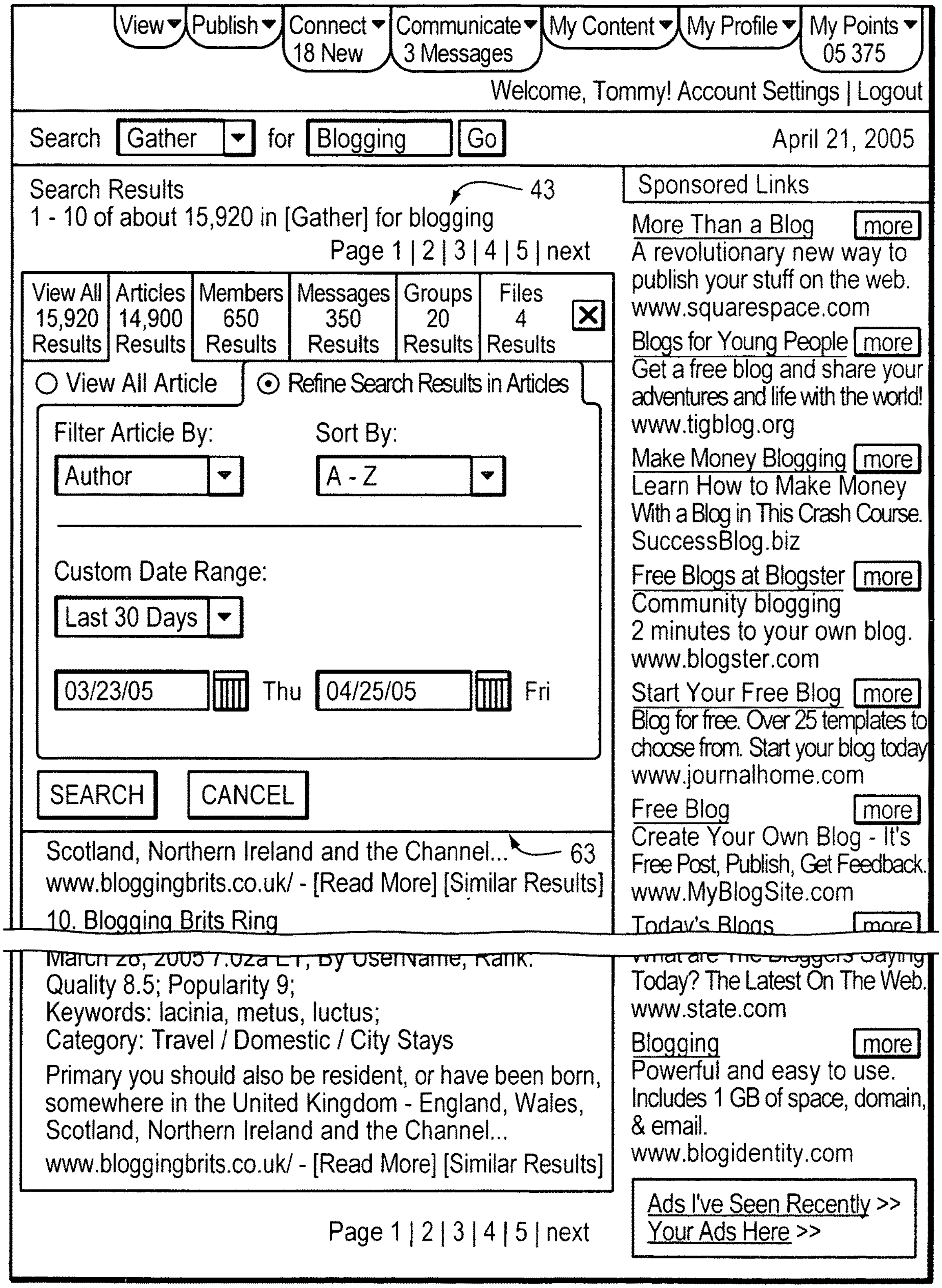
FIG. 4*d* is a screen view of search results and search facets in the reader search operation of the present invention.

Search operation 25 is the interface to a search engine for processing user queries and generating search results 43 thereto. FIG. 4*d* is illustrative. A relational database search engine or other data search engine may be employed. In a preferred embodiment, search facets 63 are used to filter candidate search data/results. This has the effect of narrowing available content. In one embodiment, search facets include quality rating, date, topic, time, recency of publication, length of publication, author rating, article rating and degrees of separation between user. In other embodiments, different facet options are made available after use of an individual facet, and/or facets change with each drill down by the user. In some embodiments, these facets 63 are used to order contents for search results but not filter the contents.

Initial categories or areas 65 (FIG. 2*b*) of search include the global network 70, the invention website 100, users of (registered with) the invention system 100, articles (authored works 29), reviews (other authored works 29), groups and schools.

View operation 27 generates screen views for display by client computer 50 to end users. An end user (individual) may be a reader-user at times and a writer-user (or author-user) at other times as further discussed later. FIGS. 4*a*-4*b* illustrate the initial screen views 51 generated by view operation 27 in response to log in by a subject user. Subsequent screen views are exemplified by FIGS. 4*c*-4*d* described later.

The particular user's home page 51 in system 100 indicates articles (authored works 29) and reviews 67, 69 (FIG. 2*b*) respectively. The articles may be featured articles of system 100, the user's own articles, friends' articles, family articles, connections articles 76 (FIG. 4*a*), neighborhood articles and recently read ones. Reviews 69 may be of subcategories such as products, entertainment, travel, arts and culture and happenings.

Figure 9:
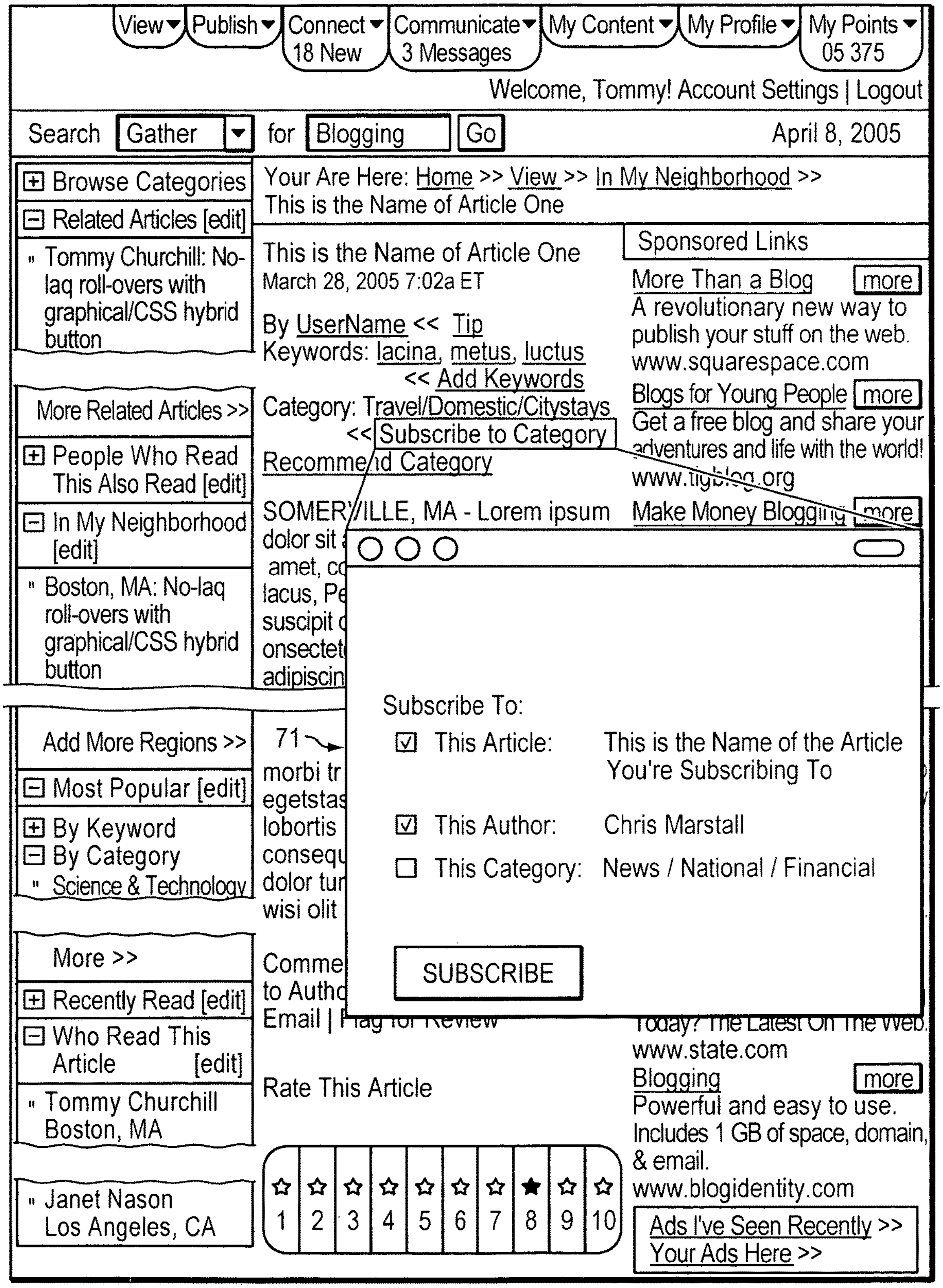
FIG. 9 demonstrates how a user may subscribe to the content of another user, content by all users filed under a common topic, or content published to a group of users.

The user's home page 51 (or initial screen view by View operation 27) also includes indications of subscriptions 71 (FIGS. 2*b*, 4*a*) by the user. The system 100 preferably allows a user to subscribe to other people, other users of system 100, topics, Groups, articles (authored works 29) and tags or taxonomy categories and the like. FIG. 9 shows an example graphical user interface enabling a user to subscribe to the content of another user, to the content by all users under a common topic area, and/or to content published to a grouping of users.

The user's home page 51 includes an indication of Groups 73 (FIG. 4*a*) the user belongs to, displays photos 75 of interest to the user, provides podcasts 77 (FIG. 2*b*) and user file uploads 72 (FIG. 2*b*).

The system 100 may automatically refresh home pages 51 of users on a preset frequency (after a preset period of time has elapsed). Refreshing the screen view 51 brings in new content and advertisements.

Tables IIa and IIb are the supporting data organization and structure of home page 51 in a preferred embodiment.

TABLE IIa

Members have a home page 51. This home page displays all member information to the member himself and all public information to other members determined by their privileges.

| Feature | Description |
|---|---|
| Display information based on privileges. | The home page shows all the member's information to the respective member while other members can only see of this member what fit their privileges. |
| Customizable content and layout | The member is able to customize his home page 51. He is able to set what information he wants to display and where on the page. However, he cannot prevent the headers (taxonomy/tags, header and ads) from being display. Only the middle (the content) pane can be customized. |
| Home viewed by owner ("My" page) | The following information can be shown on the member's home page 51:<br>Top 4 latest articles published by the member with the newest at the top<br>Report summary on article viewing<br>User's connections that are currently online<br>Users connections<br>Articles suggested to the member by the system.<br>People subscribed to by the member with the ones that have the most recent articles (not read by the member) at the top.<br>Groups the member belongs to with the ones that have the most recent articles (not read by the member) at the top.<br>The members' contacts.<br>The members' bookmarks.<br>Member's recently read articles<br>Taxonomies/tags subscribed to with ones that have the most recent articles (not read by the member) at the top.<br>Account balance |

TABLE IIa-continued

| Members have a home page 51. This home page displays all member information to the member himself and all public information to other members determined by their privileges. | |
|---|---|
| Feature | Description |
| Home viewed by other member (member's name space page) | The following information can be shown on the member's home page 51 when viewed by someone else. Clearly, this information depends on who views the page and the information view properties: The members' connections, Latest articles published by the member and not read by the viewer. Groups the member belongs to. Public bookmarks. Public subscriptions. Recently read articles |
| Taxonomy/tag category published under | Member should be able to specify the "taxonomies/tags under which I publish" and the viewers can click on them which shows the articles written by member in that taxonomy/tag category. |
| URL for home page | Members home page can be accessed via the following url schema: global network 70 protocol://<member name> system site address. |

Table IIb. Standard Home Page for Known/Unknown Users

A standard home page 51*a* (FIG. 4*b*) is displayed to known and unknown users. The information on this page aims at enticing the user to become a member. This page 51*a* contains:

Outline from featured articles.

Sign up/login capability

Browse taxonomy/tags

Search boxes that search either system site 60 or the web.

Current promotion for members (clicking goes to more info on promotions)

Most popular members (clicking goes to more info on membership).

Clicking on a member only shows minimal member information (First name, first letter last name, country).

Based on the profile information gathered about the known users this page 51*a* will change. The ads on this page 51*a* are preferably rotating from ads (4/5 of times) and reasons to become a member (1/5 of times). The ads shown are tailored based on the subject user's profile gathered so far.

Figure 2C:
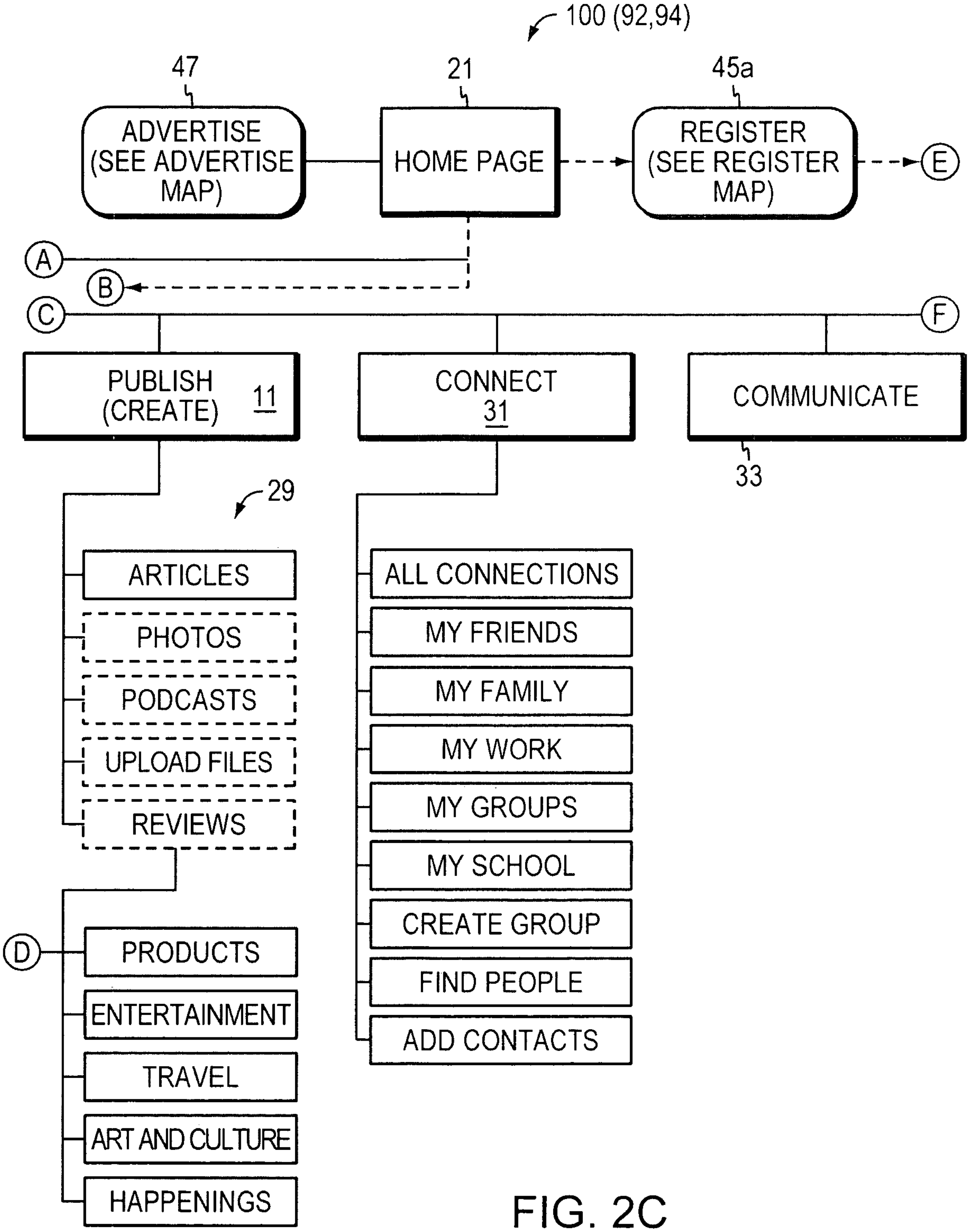
Figure 2D:
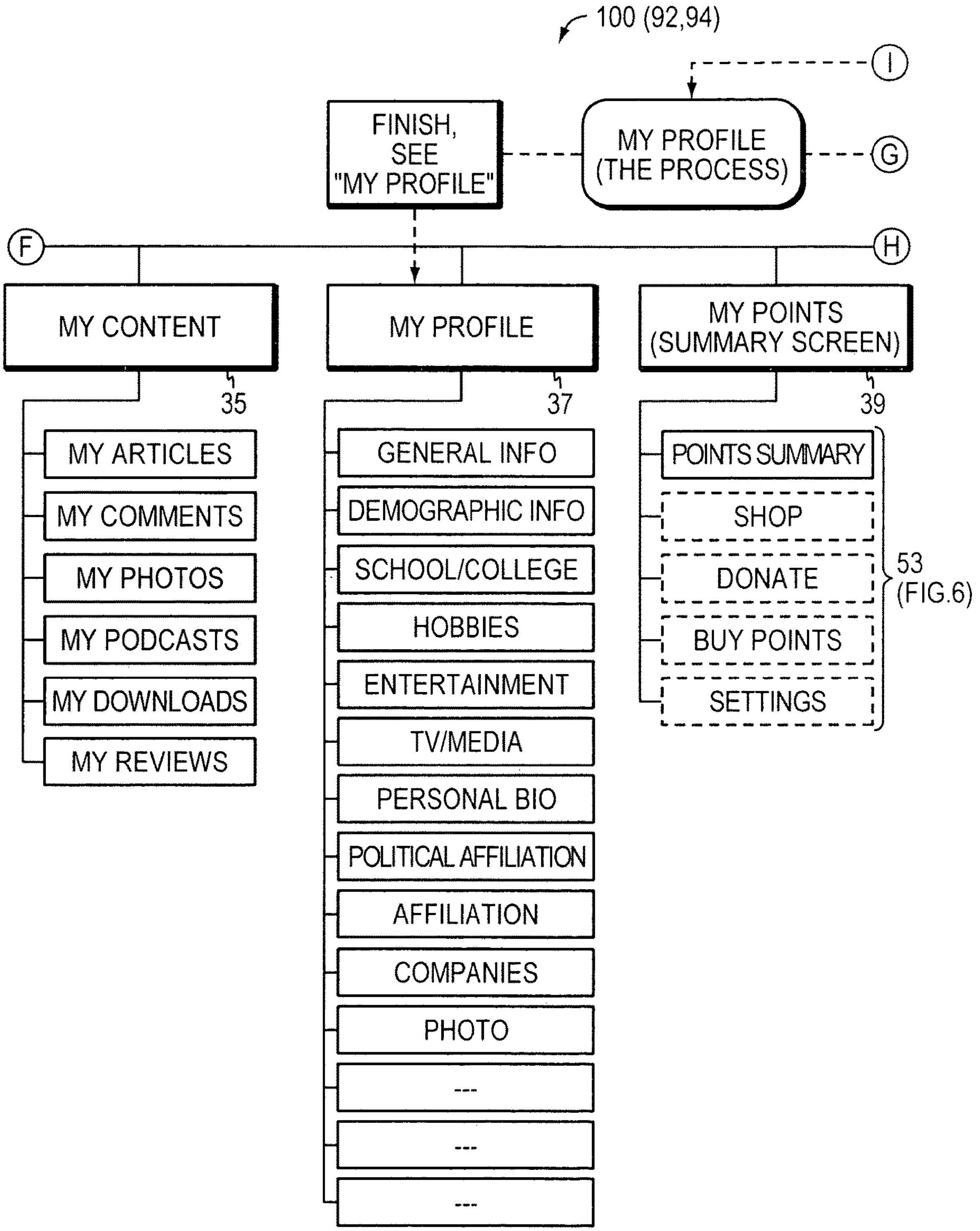
Figure 2E:
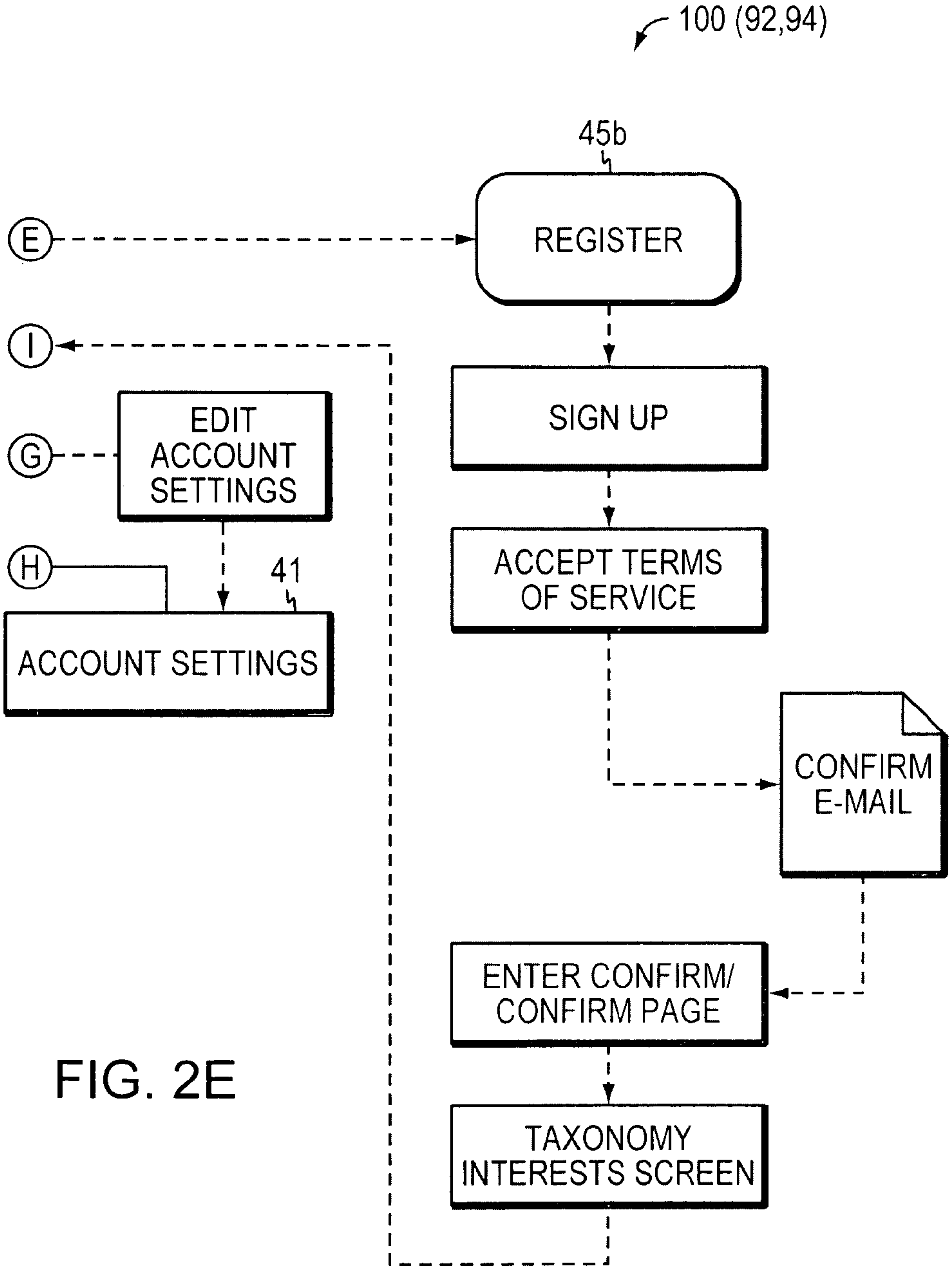

Continuing with FIGS. 2*c*-2*e*, publish operation/module 11 enables a writer-user to create a piece (authored work) 29 including any one or combinations of text, images, audio, video, graphics, multimedia, files to download or XML descriptions of any of these items. Further details are given below in FIGS. 3*a*-3*d*.

Figure 8A:
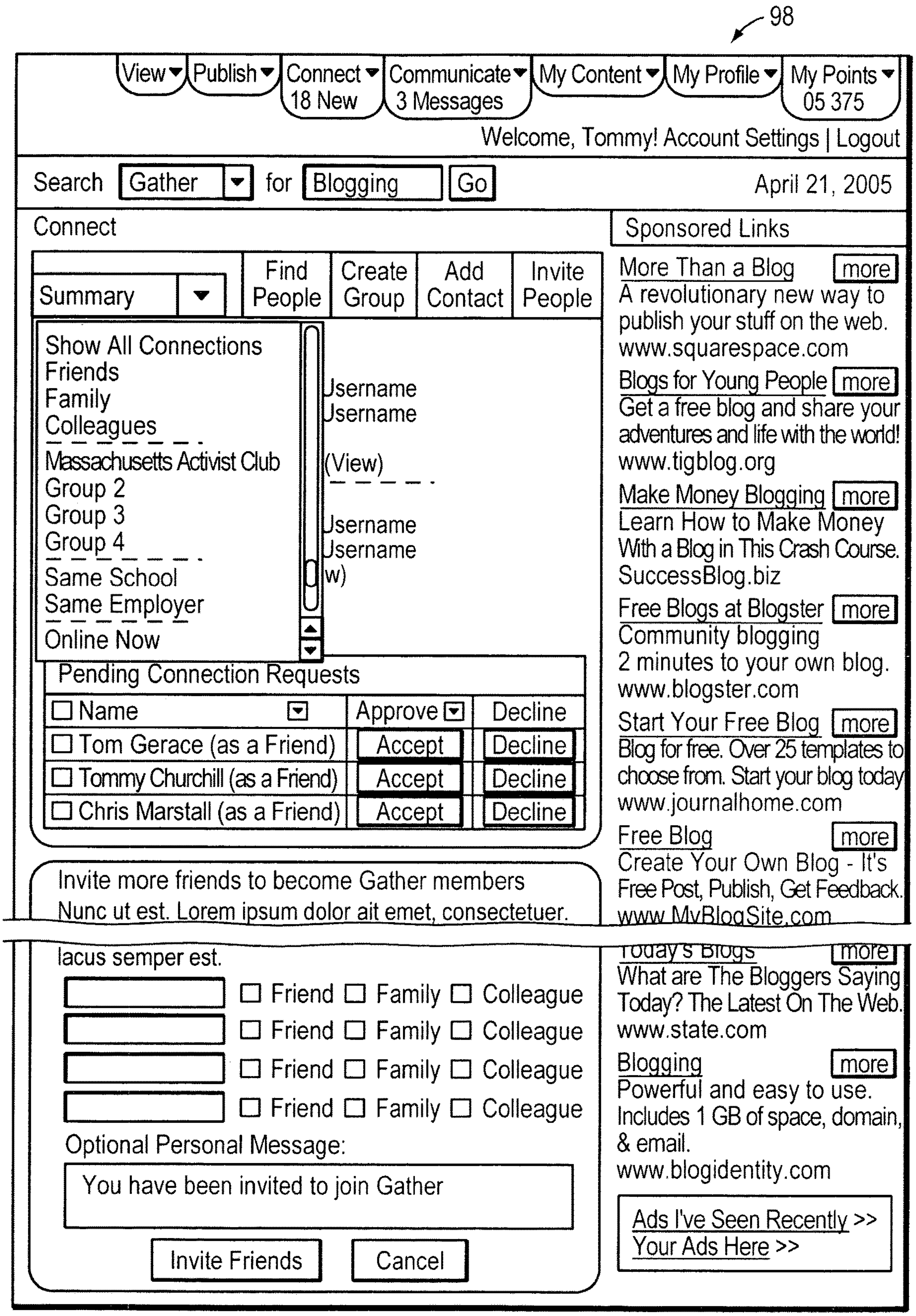
FIGS. 8*a*-8*c* demonstrate how users form connections to other users and define arbitrary groups of users.
Figure 8B:
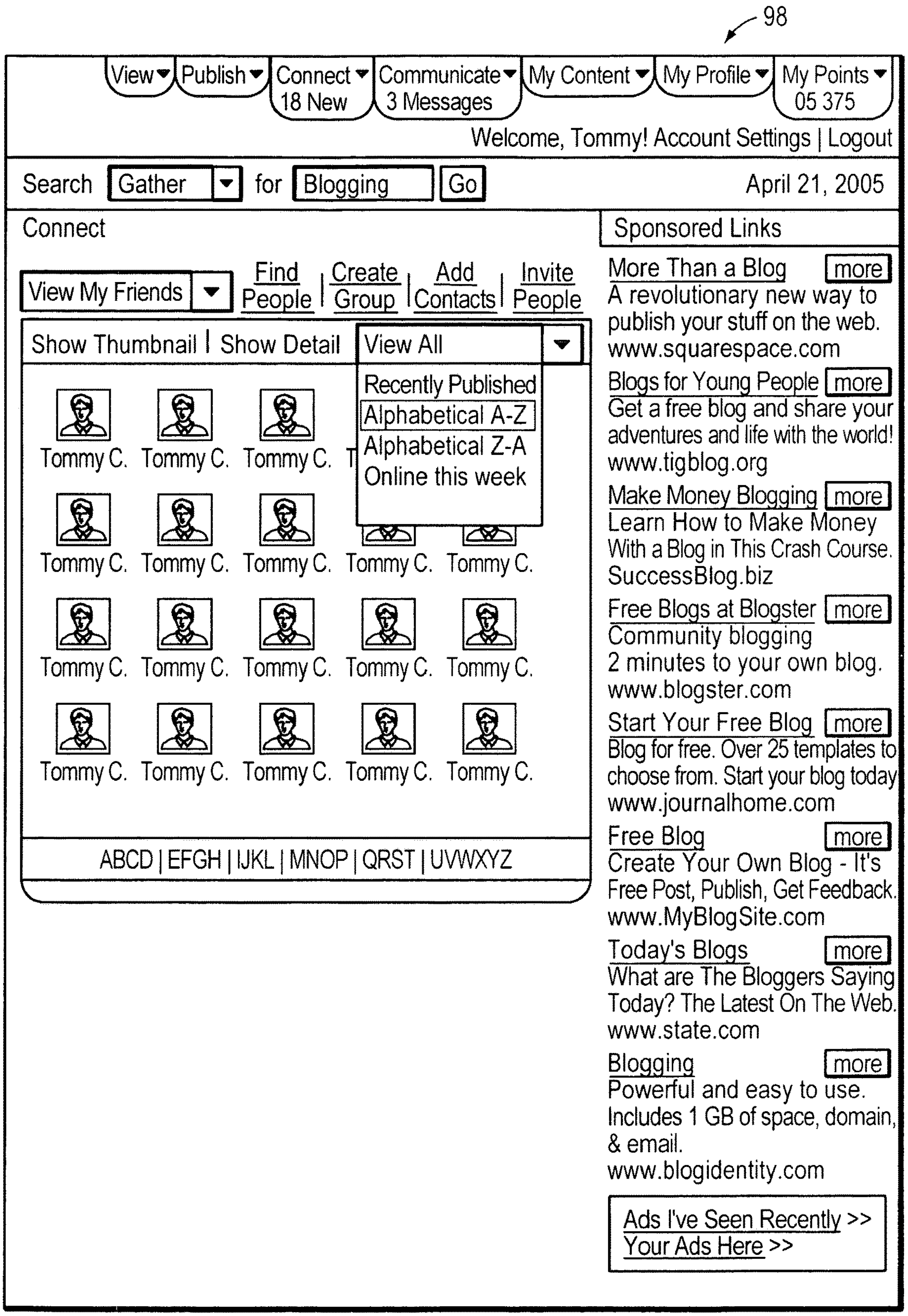
Figure 8C:
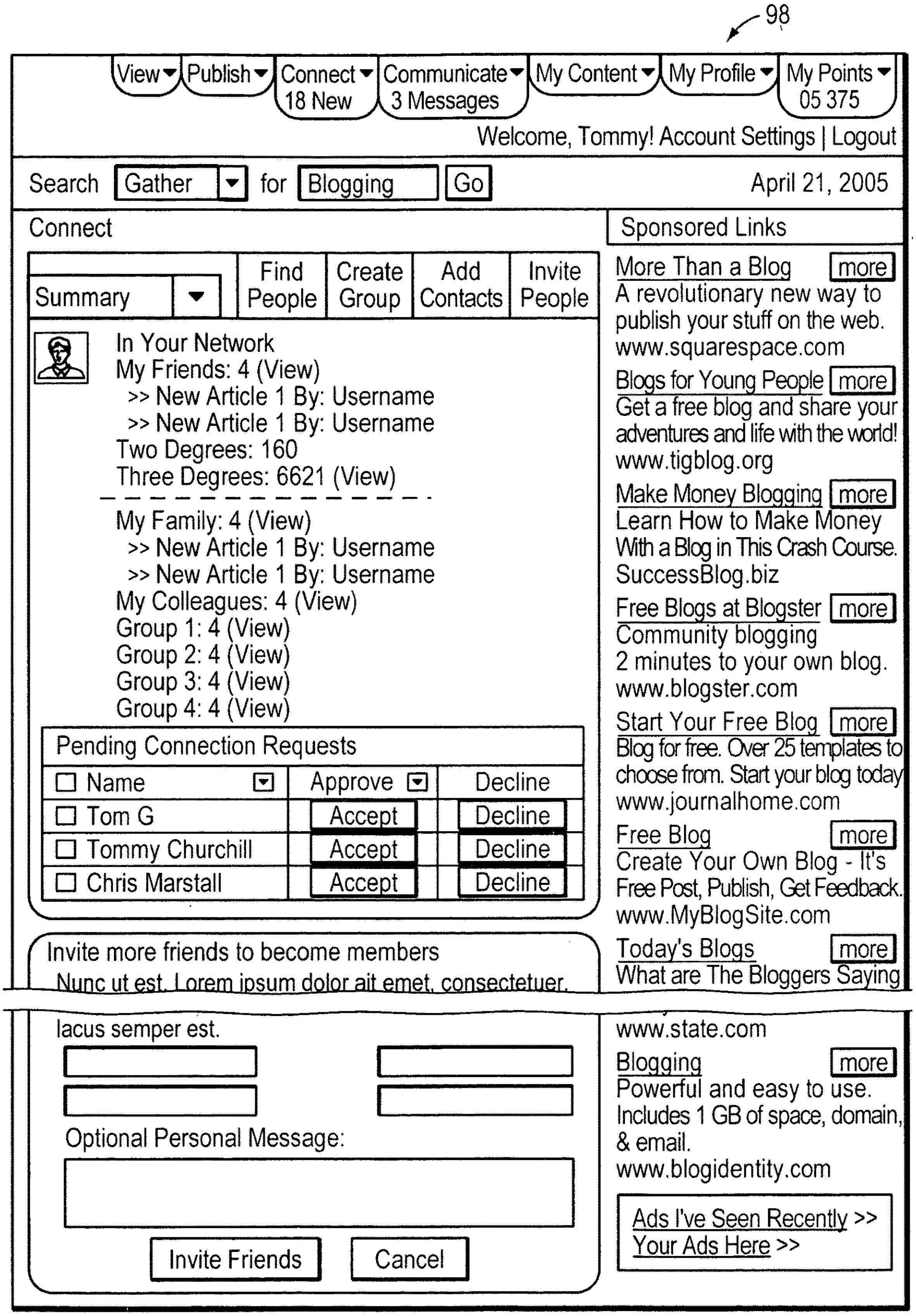

Connect operation 31 is an address book of sorts which enables a user to specify categories and relations of people. Preferably each entry indicates one of the categories of 'family', 'friend', and 'work', and may thereby define subsets or groupings of people similarly related to the subject user. Connect operation 31 also enables users to organize groups, make a school grouping, find people and add contacts. Tables Ic. and If. above support connect operation 31. FIGS. 8*a*-8*c* are further illustrative of a user interface for enabling user-definition of connections (category and degree of separation) to other people.

Communicate operation 33 (FIG. 2*c*) is an email service. Any of the known email software applications is suitable here.

Continuing with FIG. 2*d*, My Content 35 stores a given user's published content 29 (labeled 'My Articles' and 'My Reviews') or elements for use in composing authored works 29. Included are images, audio files, multimedia clips, video clips, download files and the like. Also My Content 35 includes comments the user has made on other's articles (works).

Accounting settings 41 also result from the user profiling (registration) process 45. The present invention system 100 is preferably a point and/or cash based system. Known users can earn points. However, the points are not debited from a writer-user's account until the user becomes a member of system 100. Known users cannot redeem points unless they have subscribed to the system 100. If they subscribe using the same browser used when browsing, their accumulated points are transferred in their newly created account (because the points will be in the cookie).

A user's points and other related accounting is provided by points operation 39 (FIG. 2*d*, 2*e*). A report generator may provide various displays and output of data from points operation 39. FIG. 6 discussed later illustrates one embodiment.

Overall, the present invention system 100 is formed of (a) an author contribution mechanism, (b) a method for organizing user-contributed content and (c) a sub-system (or platform) for aggregated user publishing. FIGS. 3-10 further illustrate each of these aspects as described in detail below.

In general, the present invention provides a computer method and system (eg., Website or portal) that enables individuals or organizations to publish content on a global computer network such as the Internet. The author-user composes and submits authored works through a composition module 11 (FIGS. 2*c* and 5) of the present invention software 92, 94. As shown in FIGS. 3*a*-3*d*, the composition module 11 allows the author-user to specify a title 40 of the piece and to select a category 42 (e.g., politics, business, science and technology etc.) for the current to-be-authored work 29. Composition module 11 provides a working window or other such area 49 that enables the author-user to embed hyperlinks, images, multimedia and the like. Note that the author may post just multimedia elements and nothing else, files to download, images, video, sound files including music, and may do so without accompanying text.

Further, the composition module 11 enables the author-user to categorize or classify the subject matter of the authored work 29 using a taxonomy, for example, which is fixed (predefined) for all authors. Such taxonomy may be multiple layers deep as illustrated at 42 in FIG. 3*b* and may change from time to time. In addition, the composition module 11 at 61 suggests various tags and key words to index the authored piece 29 based on the content in that piece, keywords related to any articles cited in that piece and key words used in other pieces by the same author. These keywords are used to allow users to search for content more efficiently, navigate to this article from other content with similar tags or see what general topic areas a user is reading or writing (when all tags across all of a user's writing or reading are brought together). The author may add to these tags, remove any or all of them or create his own replacement set.

In a preferred embodiment, the invention taxonomy and tagging provide disambiguation. For example, if a user specifies "Macintosh" the invention taxonomy/tagging subsystem determines the subject term may mean a variety of apples in the cooking category, specifically pies, as well as a name in the computer category or related to graphics. In order to disambiguate, the taxonomy/tagging subsystem looks at each term "apple", "cooking", "pies", "computer" and "graphics". The term "apple" does not disambiguate between the categories of "cooking" and "computers" where the term "apple" has standard meanings in each of these categories. The taxonomy/tagging subsystem selects the two most specific, non-overlapping terms "pies" and "graphics" and displays these to the user for selection. This causes the user (his response and selection) to disambiguate the possible categories of the initially specified term "Macintosh". If the user selects "pies", then the invention software system determines cooking/pies/apple/Macintosh to be the corresponding taxonomy/tag category and subcategories.

Figure 7:
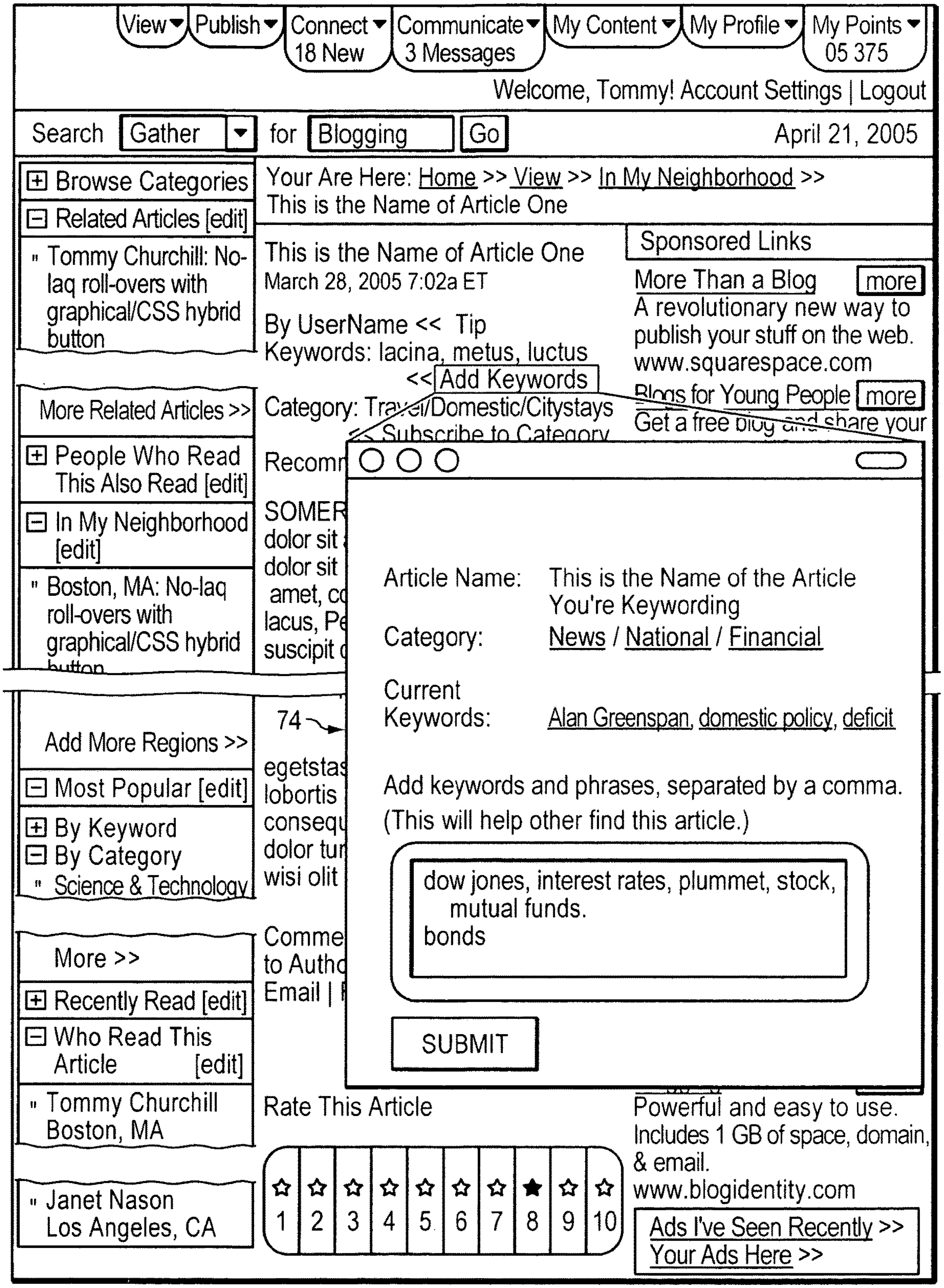
FIG. 7 demonstrates a reader-user's ability to tag an article written by a writer-user.

After the author-user has completed composing his subject authored work 29, he submits the authored work for publishing by the invention system 100 (via composition module 11). Once the work 29 is published, other users may "tag" this piece 29 with keywords as well. FIG. 7 illustrates a reader-user tagging an article 29 published by another user (the author-user) in one embodiment. The system 100 may weight the author keywords and the other user keywords differently for any of the phrases listed. The system 100 stores the keywords as metadata of the authored work. System 100 preferably displays in rank order keywords assigned to an authored work. A default rank is given to author-user assigned keywords.

In one embodiment, a keyword is assigned to a bookmarked authored work such that the keyword enables subsequent searching for the authored work. For example, system 100 displays the keywords of an authored work. In response to user selecting (or otherwise operating on) a displayed keyword, system 100 initiates a search and displays the search results. The search results include a list of other keywords as well as authored works similarly categorized by the user selected keyword. System 100 enables the user to utilize the other keywords for narrowing or adjusting the search.

Also illustrated at the bottom of FIG. 3*b*, composition module 11 enables the author-user to specify demographics and geographic region of readers targeted for the subject authored piece 29 (or thought to be of relevance/interest). General geographic areas (cultural boundaries) as well as specific continent/country/city may be indicated in further (e.g., drilled down) windows. Geographic designation may be expressed in terms of distance from a user specified point. Composition module 11 may suggest (in a pick list or the like) the author's hometown, current location, areas of frequent travel and similar locations.

The present invention software 92 (composition module 11) enables the author-user to specify timing and circulation reach of the authored work. With respect to timing, the preferred embodiment enables the author-user to specify whether to publish the article live or save the authored work 29 until a determinable date. The bottom of FIG. 3*c* and the break away portion of FIG. 3*d* illustrate this. With respect to circulation reach, the invention software 92 enables the author-user to limit the readership audience of the particular authored piece 29 as illustrated in FIG. 3*c* and the bottom of FIG. 3*d*. For example, the author-user is able to select categories of readers such as friends, family, generic or other arbitrary groupings, including degrees of separation by such associations, or to specific or individual users, and make his article available to just those users identified. The author may also make his work available to anyone who has registered as a member of the Website/system 100, or to anyone using the global computer network 70.

Figure 3A:
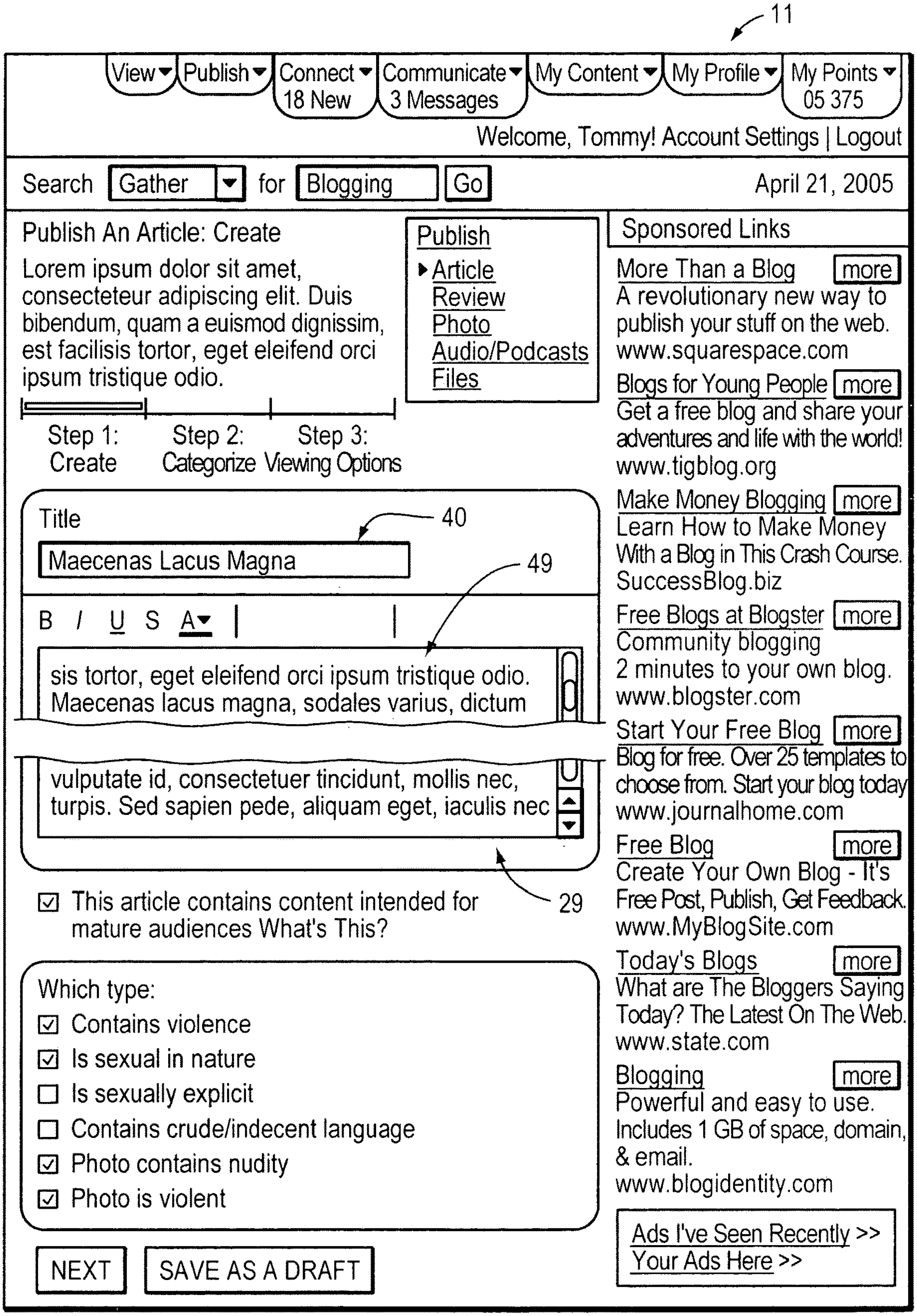
Figure 3C:
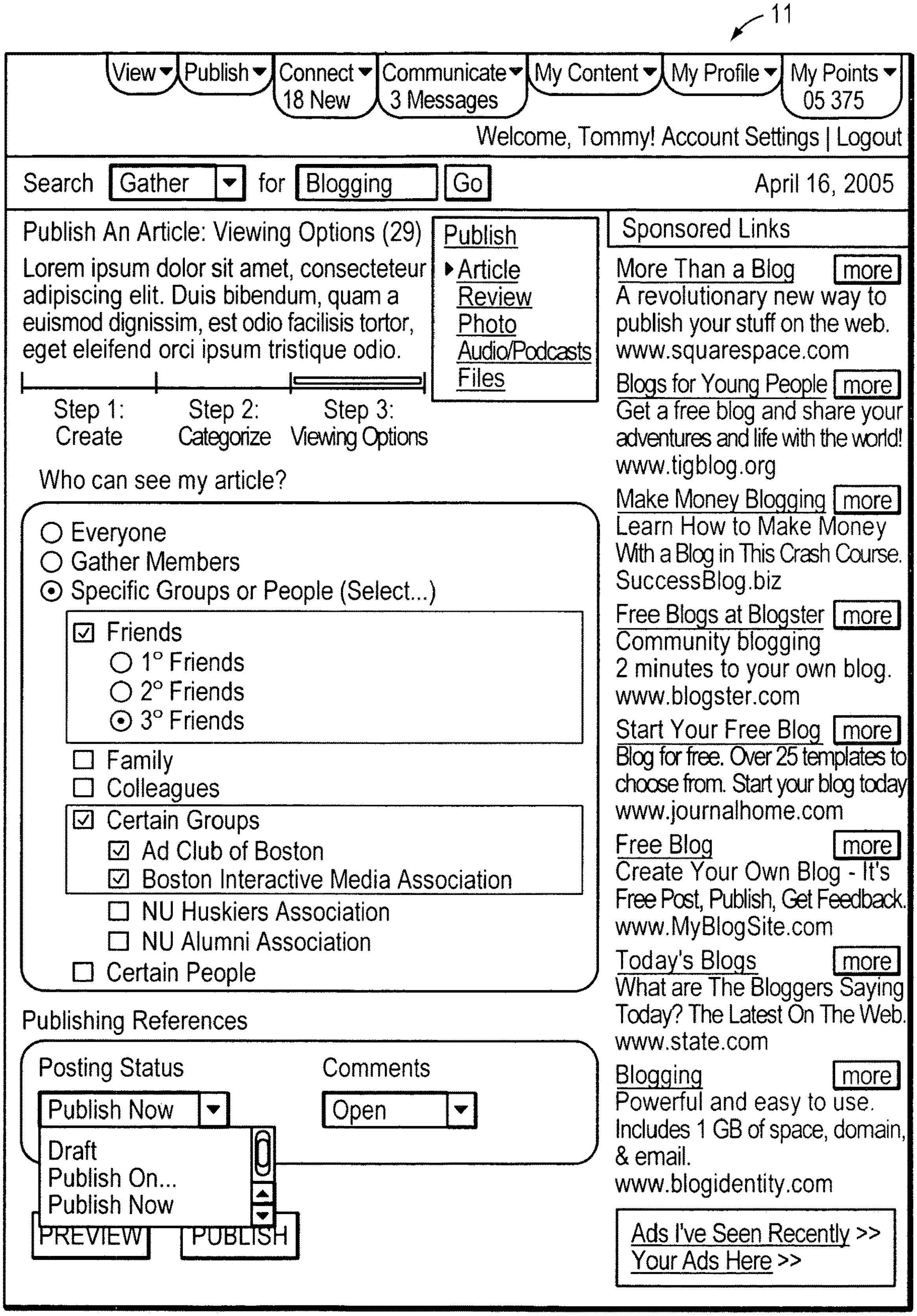
Figure 3D:
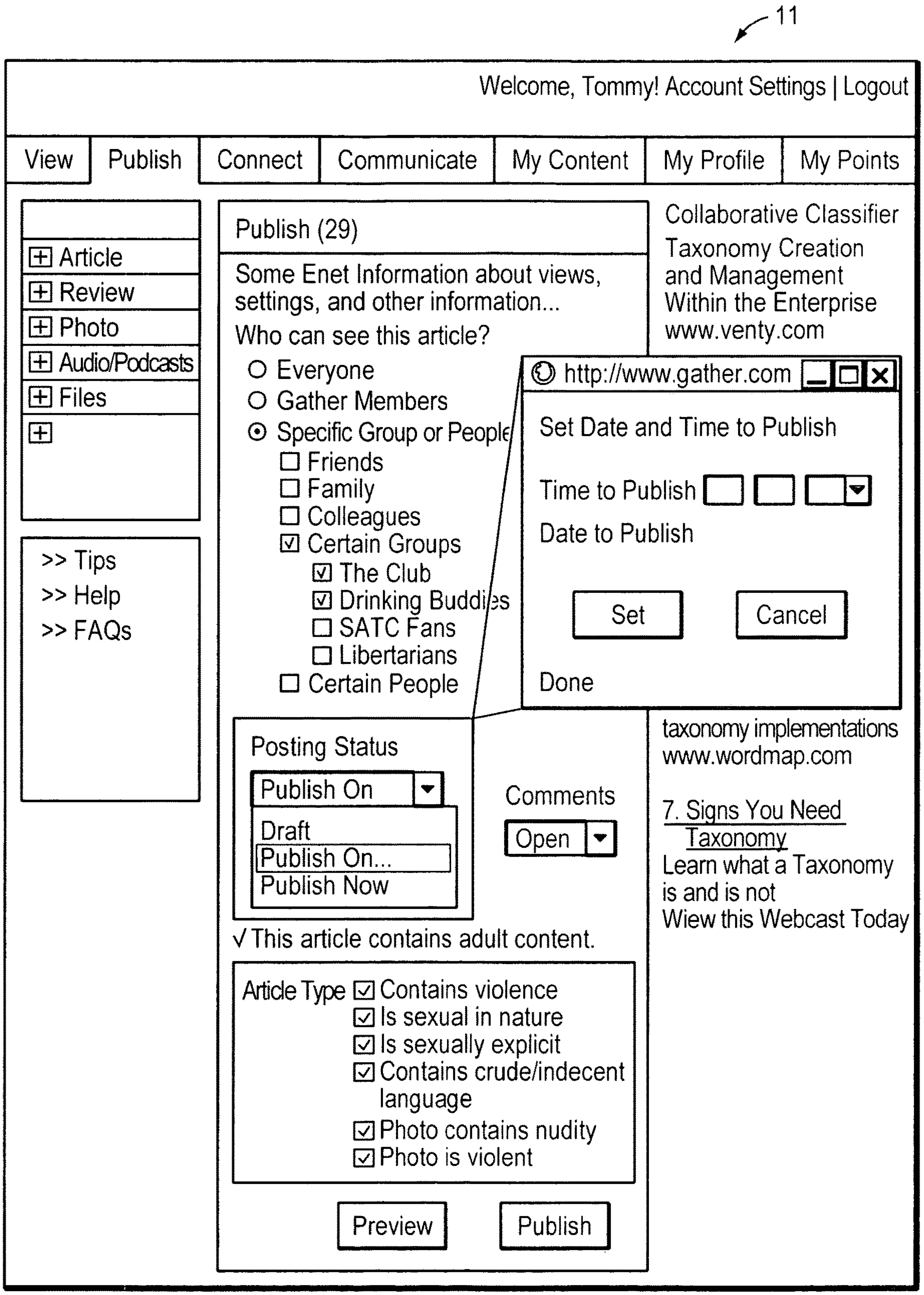

The user interface of composition module 11 may further allow the author-user to specify adult content contained in the subject authored work 29 as illustrated in FIGS. 3*a* and 3*d* (bottom). This in turn indexes the authored work so that reader-users can filter out or specifically search for and select articles based on maturity designation.

Reader-users (or a user in general) log into the invention Web site system 100 hosted by server 60 and search for specific content or browse for various content through invention software 92, 94 (search operation 25, view operation 27). As mentioned above, FIGS. 4*a* and 4*b* are illustrative of initial screen views 51 rendered by view operation 27 and displayed to the user. In a preferred embodiment, the reader-user subscribes to content offered through the Web site/system 100 by any combination of author, topic, related people and/or groups/organizations as illustrated in FIG. 9. Users are also allowed to establish connections of different types with their family, friends and work colleagues that allow them to see (at 76, FIG. 4*a*) material written by these connections. Connection operation 31 supports this function. Additionally, users may choose to see content published for their local area or regions to which they might travel.

As mentioned above in FIG. 7, at window or similar working area 74, reader users, when reviewing an article, may suggest for the article alternate taxonomical category or tags or new ones of such that were not previously suggested by the author. The system 100 compiles frequently suggested categories/tags for this article, ranking them by frequency, and may add them to the article's classification (e.g., upon reaching a threshold number of times suggested by readers) for better indexing.

Also, when an authored work is displayed for a reader, system 100 in one embodiment displays the authored work's taxonomical and/or tag categorization (a hierarchy of top category, subcategory, etc.). System 100 further allows a user to click on (select) any level of the displayed hierarchy/categorization to see other articles similarly categorized under the selected taxonomical and/or tag category. Thus system 100 responds to such user selection by searching for authored works tagged with the selected taxonomical category and by displaying a list of the search results and the like.

Upon a reader-user selecting an authored work published by invention software 92, 94, a reader module 13 (FIG. 5) collects ratings from the reader. In a preferred embodiment, the ratings are easily provided (by a single click) by the reader-user. FIG. 4*c*-2 (bottom) is illustrative. Multiple rating areas include distinguishing the piece (selected authored work) between serious and humorous subject matter, rating the writing quality, rating the presentation, rating to distinguish between conservative and liberal points of view, rating the suitability for different audiences or age groups, evaluating the compliance with various standards, or determining how well an article was categorized. A radio button indicator, slide indicator, numerical or other indicator next to each rating area is easily single clicked by a reader-user to effectively submit his rating in each of the multiple rating areas. Other user interfaces for obtaining reader ratings are suitable.

Figure 5:
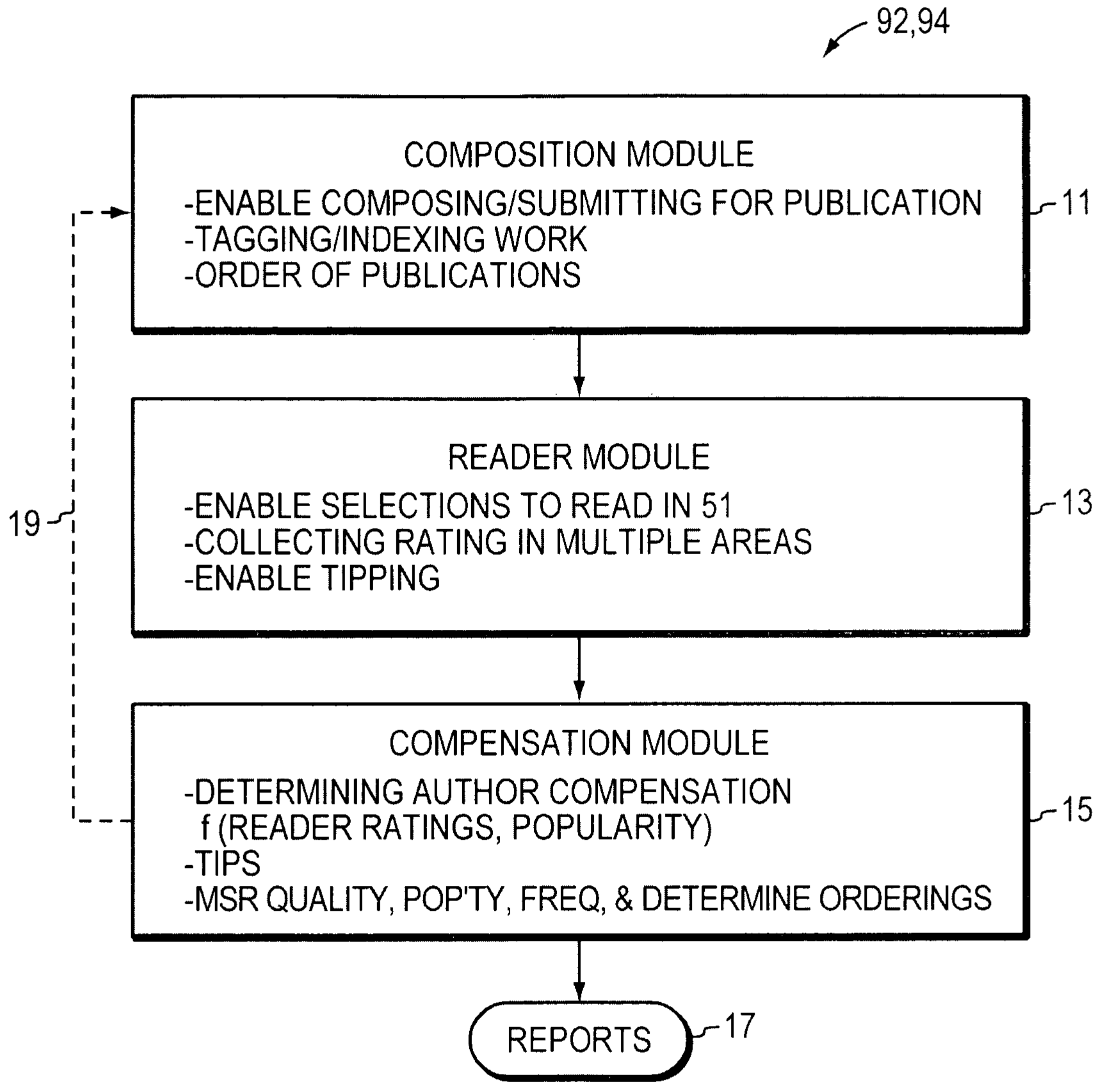
FIG. 5 is a flow diagram of one embodiment of the present invention.

In a preferred embodiment, "ratings" by a reader-user also include actions taken by that user involving a subject authored work 29. If the reader-user recommends, forwards or otherwise effectively promotes the subject authored work 29 to other readers, for example, then the system 100 includes such as a positive rating in the collection of ratings for the authored work 29 at reader module 13 (FIG. 5).

A compensation module 15 (FIG. 5) determines quality of each authored work 29 stored at My Content 35 (FIG. 2*d*) of a user of invention software 92, 94. In particular, compensation module 15 determines quality as a function of the collected readers' ratings and popularity of an authored work. In one embodiment, popularity is evaluated based on the number of registered, non-registered and total users reading an article (authored work), how often that article is bookmarked and/or how often an article is forwarded (recommended, and the like) to another user. The compensation module 15 determines patterns of collected readers' multiple area ratings and therefrom traffics articles accordingly on the Web site. The determination of quality may include a standardization of individual reader rankings relative to other readers. Further, the compensation module 15 detects barbell curves of collected and graphed rating data; or other such determinations may be made by the compensation module 15 using data analysis and techniques known in the art.

In a preferred embodiment, the compensation module 15 measures quality, popularity and frequency of writing of an individual author. From these measured amounts the present invention is able to determine categories of topics in which the author was rated highly more often than in other categories and thus make a determination that the author was better at writing on one topic than another.

Also, compensation is preferably based on the determined popularity and quality of the authored work. The compensation calculation may follow the equation:

$$\text{Payment for this one article}=(A\times\text{popularity})+(B\times\text{quality})+[C\times(\text{quality}\times\text{popularity})]$$

where A, B and C are settable values of the present invention. Popularity is a tallied amount representing the number of readers who selected the authored work through the reader module 13 (or as noted above, based on bookmarking and forwarding of the content, or some combination thereof). Quality is on a scale from 1-10 for example. For every five readers who submit a high rating (through reader module 13) for the subject piece, compensation module 15 increments one unit on the quality scale, for example. In one embodiment, quality is set at the average level across all readers/ratings for the authored work. Other calculations (rate and scale) to quantitatively set quality may be employed.

In one embodiment, a threshold number of readers must rate the authored work before the compensation module 15 makes a determination of quality of the subject authored work 29. Reader ratings may be normalized based on reader population.

In one embodiment, system 100 allows one or more editors or experts promote one or more or certain ones of the authored works 29 in the system. This promotion by experts may be done at variable levels across different experts. A total of the promotion of a subject authored work 29 is determined either by (i) a sum of activities by each promoting expert or by (ii) an average of activities by the promoting experts.

Compensation module 15 further rates an author within a taxonomical category and/or within a keyword combination based on average rating of authored works by the author. Ratings may be obtained from "experts" in addition to (or instead of) other readers. The "experts" are a top certain number (e.g., an absolute number, a fraction, etc.) of author-users on a taxonomical category and/or within a keyword combination. Further, an "expert" is an author-user having (i) authored a threshold number of articles 29, (ii) a threshold number of other users who have rated his authored works 29, or (iii) a threshold number of subscribers. In some embodiments, an "expert" is a user who remains in the top certain percent of most popular authors on a taxonomical category.

Further, compensation module 15 may identify an expert as a general expert or a sitewide expert. System 100 may record and/or display expert ratings separately from other reader-user ratings.

In one embodiment, system 100 allows one or more editors or experts to promote one or more or certain ones of the authored works 29 in the system. This provision by experts may be done at variable levels across different experts. A total of the promotion of a subject authored work 29 is determined either by (i) a sum of activities by each promoting expert or by (ii) an average of activities by the promoting experts.

Compensation module 15 may rate an author based on how many times readers tip the author (discussed later). Further, system 100 may offer an authored work for sale based on number of times other readers have paid to read the authored work.

As mentioned above, compensation module 15 determines popularity of an authored work 29 based on any combination of how many times the authored work is read, bookmarked, forwarded, recommended, commented on and/or subscribed to. Compensation module 15 ranks popularity of authored works 29 within taxonomical and/or tag categories, sitewide and within keyword combinations. Authors and authored works alike may be ranked by popularity within taxonomical and/or tag categories and within keyword combinations. For example, compensation module 15 determines popularity of an author based on average popularity of his authored works 29. The author popularity may further be used to determine expert status of an author.

System 100 further alerts a user of an authored work achieving a total rating above a predefined threshold. The user is alerted by e-mail, pager, site notification, or the like.

Optionally compensation may be calculated on a flat fee basis. For example, if the authored article is read one time, then compensation is set at a specified (predefined) dollar amount and if the authored article is read another predefined number of times, then a different dollar amount of compensation applies.

The system 100 displays to the user a compensation summary 88 for his contributions (published works 29) in the system. FIG. 6 is illustrative.

In a preferred embodiment, the compensation is paid in points as an alternative to cash. Points Operation 39 (FIG. 2*d*) supports this feature/aspect. The invention system 100 can offer to convert points to cash or pay users in cash, based on user preferences or based on minimum earning thresholds set by the system software 92. Applicants' approach is to pay the author based on the value that he creates in the readership community at large. As part of a financially sound overall plan, the amount of pay may be limited as a percent of the revenue generated at invention Web site 100/host 60 or as a percent of a budgeted amount. Further, all authors may not be compensated similarly. Bonuses may apply to certain authors over other authors. Likewise, a multiplier may be used for certain authors over other authors. FIG. 6 illustrates a points transaction (accrued and withdrawn) history screen view 53.

Points earnings screen view 53 and a user interface for converting points to cash provides a segue into on-line shopping. Advertisers 47 and other affiliate merchants to the present invention system 100 provide various links, product advertisements and the like to the user through screen view 53 (among other screen views of points and/or cash equivalents). Targeted advertising may be had here due to user profile 37 (FIG. 2*d*).

A reporting subsystem 17 (FIG. 5) is coupled to the compensation module 15 and enables various compensation calculations to be reported, such as in FIG. 6, as well as article ratings (collected reader ratings) and other determinations of the present invention software 92, 94 according to accounting settings 41 (FIG. 2*e*), to be reported to the author-users. The author-user can look at an article he authored (published through system 100) and see indications of individuals (e.g., by name) or groupings of readers (e.g., by group category) who have read the article. Likewise, users of the system can look at an article (published through system 100) and see (i) general indications of people who have read/visited (clicked on) the article and (ii) indications/"footprints" of other articles that those people have read.

In a preferred embodiment, a user can view from his home page 51 (FIG. 4*a*) indications of what his connections (friends, family, coworkers and groups) are reading 55.

In another feature of the present invention, the compensation module 15 further effects the ordering of the publications stored in the composition module 11 and/or My Content 35 for deployment in the reader module 13. The publications are ordered by determined popularity and/or quality. Thus as a reader navigates through lists of possible publications to read and submits various search queries (via search operation 25), the present invention 92, 94 provides search results 43 (FIG. 2*b*, FIG. 4*d*) ordered by the determined popularity and quality. In addition, the present invention may include, in ordering search results and content listed within taxonomical and/or tag categories or as related to individual keywords, aspects such as the individual reader-user's profile 37 (e.g., conservative . . . etc.). For newly authored works 29, editors of the invention Web site/server 60 rank and rate the authored piece. Also the present invention may employ a rule that reader-user ratings are effective only after a minimum number of readers have submitted ratings on the authored piece as illustrated at 46 in FIG. 4*c*-1.

Further, the present invention may rotate the total number of stored authored works (in collection 35) by using an expiration threshold or other removal/substituting techniques. For example, certain topics may be time dependent or current event dependent on world or local news. Authored works on such topics are removed from the stored collection 35 as appropriate. If an article is not receiving reader attention, then the article may be removed from featured pages on the Website, but available when users search for content related to its topic/key words or navigate to the author's pages.

Operations of the present invention software 92, 94 to effect each of the above two features (ordering and rotating stored authored works 35) are represented by the dashed line 19 in FIG. 5.

Thus, the present invention creates a thought marketplace where an authored work is promoted based on popularity and quality as rated (ratings including number of times recommended) by the readership (audience at large). In turn, the more highly the authored article is promoted (at 19), the greater chance that more readers will read and rate the authored work. This leads to higher compensation for the authored work. Thus the present invention aligns compensation of what is written with the readership value (popularity, quality) of the article rather than at the prior art industry standard rates which pay about $0.50-$1.50 per word or per project, (e.g., $5K-$15K per book, $40-$200 per journal story, etc.)

Another feature of the present invention involves allowing reader-users to tip (pay a gratuity to) the author. At the end of an article, the present invention 92, 94 provides a web page 59 (FIG. 4*c*-2) that invites the reader to tip the author. The present invention system tracks and tallies the tips and includes these as payment to the author (in dollars or points). Here, user earnings, either as points or cash, are held in an account for the user and represented in online points or cash ledgers like in screen view 53 of FIG. 6. To transfer points from one user's account to another user's account, the system simply debits the requested number of points from the tipper's account and places it in the account of the user being tipped. Here, both users would see the transfer on their ledger (view 53). The system allows the tipper to disclose her identity or remain anonymous on each transaction or by default for all transactions.

Figure 10:
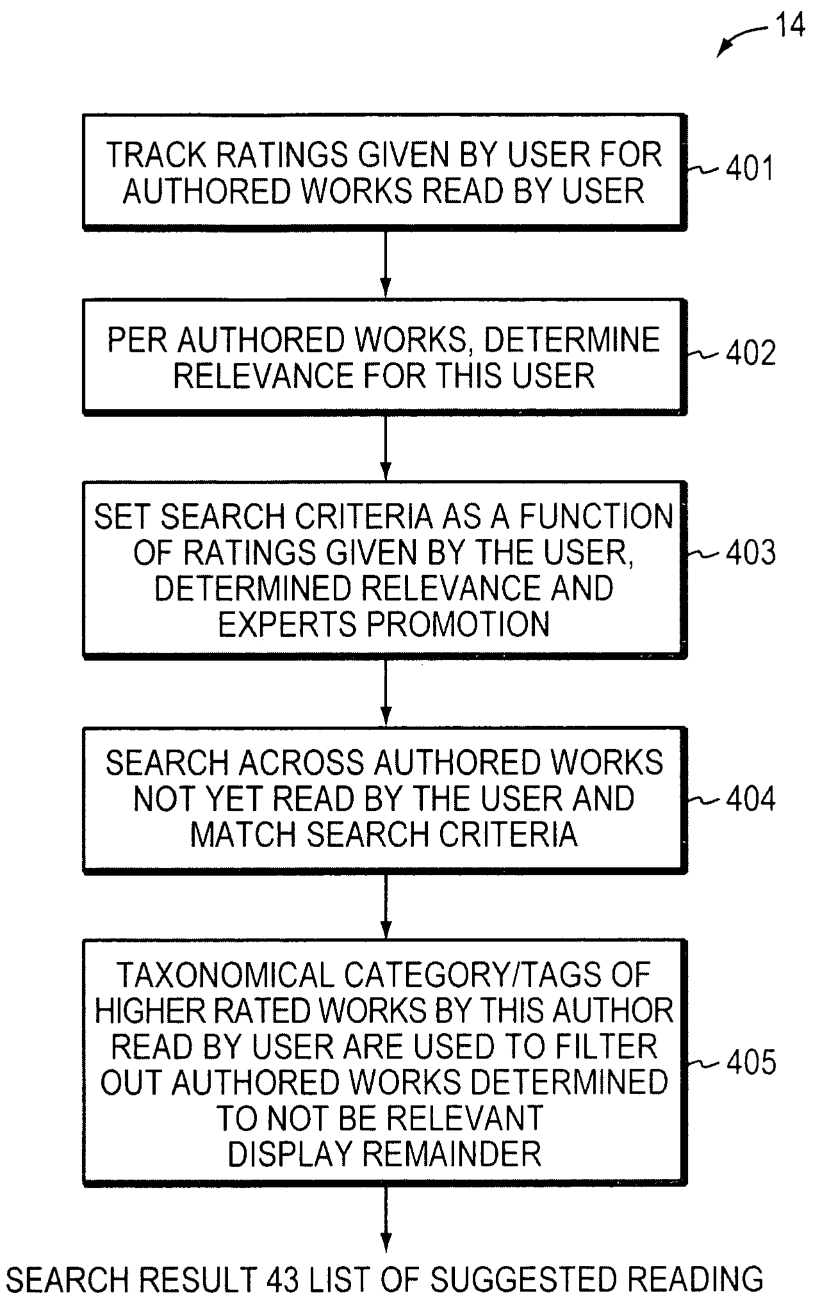
FIG. 10 is a flow diagram of a suggested reading engine of one embodiment of the present invention.

As described above, system 100 may deem certain users to be "experts." In some embodiments, system 100 allows experts to promote authored works of the system and provides a suggested-reading engine 14 outlined in FIG. 10. Preferably suggested-reading engine 14 is responsive to the compensation module 15. The suggested-reading engine 14 generates a ranked list of suggested authored works 29 for a user based on at least one of users ratings of authored works, experts ratings of authored works 29, respective relevance of authored works 29 to the user, and editorial promotion of certain authored works 29. The suggested-reading engine 14 employs weights that are automatically adjusted based on a measure of likelihood of the user to respond to the generated list.

The list of suggested authored works 29 generated by suggested-reading engine 14 may be with respect to (i) all authored works of the system, (ii) authored works within one taxonomical category, (iii) authored works of one keyword (tag) or keyword combination, (iv) authored works by a certain author, or (v) a user-selected subset of authored works. In other embodiments, suggested-reading engine 14 generates the ranked list based on authored works 29 viewed by one or more other users each having a respective profile similar to the profile of the user.

Further, the compensation module 15 may rank each author. For a given author, the compensation module 15 defines author's rank based on an average of the ratings of all of his authored works 29. The compensation module 15 makes a determination of appropriateness of each author for each reader. For a new authored work 29 by a given author, the compensation module 15 initially assigns the average of the ratings. Eventually, the compensation module 15 replaces the initial assignment for a new authored work with a subsequent determination of quality. In turn, system 100 provides to a reader access to authored works 29 by an author based on the author's rank and the determined appropriateness of this author for this reader. For a new author, the compensation module 15 initially ranks the new author based on (i) an average of author's ranks of users related to or connected to the new author or (ii) a predefined default.

With reference to FIG. 10, suggested-reading engine 14 in a preferred embodiment tracks ratings 401 given by a user for authored works read by this user. Next, in step 402, suggested-reading engine 14 determines relevance of an authored work for the user. Step 402 is repeated per authored work 29. In step 403, suggested-reading engine 14 sets search criteria as a function of ratings given by the user, determined relevance and experts' promotions. In turn step 404, according to the search criteria, searches across authored works not yet read by the user and generates an initial set of search results. Then in step 405 according to taxonomical categories or tags of higher rated works by an author read by the subject user, suggested-reading engine 14 filters out of the initial search result set those authored works 29 that are determined not to be relevant or of high interest to the subject user. Suggested-reading engine 14 ultimately displays the remainder of the search results and in particular displays a search result 43 list of suggested reading (authored works) in pertinent screen views such as shown in FIGS. 4*a*-4*d*.

In a preferred embodiment, suggested-reading engine 14 sorts the list with those authored works that are promoted by experts being placed at the top of the list. Sorting may be based on the determined relevance ranking, a ranking of taxonomical and/or tag categories and/or similar ranking schemes.

Another feature of the present invention system 100 is the determining of where content is in short supply based on taxonomy and/or tag category, done by finding a high ratio of search queries (at 25, FIG. 2*b*) with correspondingly low click-through rates on content found on the system 100. The invention system may also identify frequently searched terms and phrases, taxonomical/tag categories that are most popular, and where users are publishing most frequently.

In a preferred embodiment, content scarcity is defined as user demand for content (of a certain taxonomy/tag category) exceeding content supply (in that taxonomy/tag category). For each keyword (tag) or taxonomical category, system 100 tracks the number of searches performed involving that keyword/taxonomical category, and tracks the number of articles (authored works 29) published having been tagged with that keyword/taxonomical category. System 100 computes the ratio of tracked number of searches to tracked number of published articles per keyword/taxonomical category. The ratios that are relatively high amongst all ratios demonstrate a content scarcity.

Similarly, system 100 defines advertisement scarcity as advertising demand exceeding content supply. For each keyword/taxonomical category, system 100 tracks the number of ads targeted in that area and counts (tallies) the number of authored works 29 in that area. System 100 computes the ratio of tracked number of ads to the number of authored works per keyword/taxonomical category. The ratios that are relatively high indicate an area (keyword or taxonomical category) of ad inventory scarcity.

The system determined areas of content scarcity may be useful to an author-user indicating what topic to write on next. The system determined areas of ad scarcity may be useful to advertiser users in placing ads on the system 100.

Another feature of the system 100 is to identify what content areas are of higher value to advertisers 47 than others. Here, reporting demonstrates (i) either the actual or relative value of keywords, (ii) taxonomical/tag categories that are generating the highest advertising revenue per article view, (iii) which taxonomical/tag categories are generating the highest traffic per article published, and (iv) which taxonomical/tag categories are generating the highest advertising revenue per article published. This feature may be combined with the feature listed immediately above to show areas with little content (low number of published works on a given subject matter), but high value, encouraging users to write additional content (articles/pieces) in these areas.

In order to prevent the point system from growing out of proportion of the revenue of the invention Web site 100, Applicants keep Web site revenue and points aligned. The projected web site ad revenue per day is calculated as an average of the ad revenue of this same day of week over the last several weeks, or may be considered as an average or median of a number of days in a prior time period. The projected site ad revenue per day is multiplied by a percentage of the revenue reserved for author-users' compensation. This percentage of the projected site ad revenue represents the total cash available for distribution to authors either in points or cash. The conversion from points to cash may be for example two cents per point.

While this invention has been particularly shown and described with references to preferred embodiments thereof, it will be understood by those skilled in the art that various changes in form and details may be made therein without departing from the scope of the invention encompassed by the appended claims.

For example, although the foregoing describes a client-server computer architecture, other configurations, data structures and architectures are suitable.

Further independent of author compensation and reader rating features, the invention system enable users to navigate through content via a variety of methods and means. The system 100 provides user assistance through content ratings, author ratings, navigation by topic, by faceted or polymorphic search and the like. The system 100 may provide assistance by ordering authored work pieces 29 or by filtering them based on user-defined characteristics (e.g., no articles less than x characters, no authored works older than y days, etc.). The user subscriptions based on authors, topics, keywords, etc. further aids in finding desired authored pieces.

As used herein reader-user "ratings" with respect to a given authored work 29 include any combination of user-selected indications of rating, user-made recommendations to read the given authored work, user-made comments, user-forwarding of the given authored work, user tipping the author and other user activity involving the given authored work 29.

Also as used herein, "keyword" and "keyword combinations" include one or multiple keywords, a hierarchy or cascade of keywords, a series, sequence or other grouping of keywords, multiple word phrases ("key phrases") and the like. A keyword or keyword combination may be in the form of a tag, a taxonomical indicator or other form.

What is claimed is:

1. A computer system for categorizing digital works using user-suggested keywords on a global computer network, said system comprising:

at least one server coupled through a global network to client devices, each client device associated with a user, the at least one server having:

a processor configured to execute instructions of a computer program, the computer program including instructions to, for each of a plurality of digital works:

provide the digital work to client devices together with a form for accepting user-suggested keywords for the work, accept one or more user-suggested keywords, compile the one or more user-suggested keywords into a set of user-suggested keywords, and determine, for each of the one or more user-suggested keywords, a count of users that submitted each keyword; and a searchable database storing:

the plurality of digital works, and an index comprising categorization tables associated with each of the plurality of digital works, each respective categorization table storing:

a set of navigational keywords for the digital work, the set of user-suggested keywords for the digital work, and the count of users that submitted each of the user-suggested keywords;

the processor further configured to execute the computer program, the computer program further including instructions to:

without further human intervention and for each respective categorization table, add at least some of the user-suggested keywords for the digital work to the set of navigational keywords for the associated digital work, based on the count of users that submitted each of the user-suggested keywords, thereby generating an updated set of navigational keywords, and resulting in an updated index; and in response to a request from one of the client devices:

perform a search of the searchable database using search terms received from the client device and the updated index; and return search results to the client device.

2. A computer system as claimed in claim 1, the computer program further including instructions to:

display a hierarchy or cascade of at least some of the keywords in the updated set of navigational keywords of a given digital work in a manner that enables users to select any level of the hierarchy or cascade; and in response to user selection of a level of the hierarchy or cascade, enable display of additional digital works with associated categorization tables having navigational keywords matching the navigational keywords in the selected level of the hierarchy or cascade.

3. A computer system as claimed in claim 1, the computer program further including instructions to display in rank order the navigational keywords assigned to the digital work.

4. A computer system as claimed in claim 1, the computer program further including instructions to, for each digital work:

obtain at least some of the user-suggested keywords from a user responsible for creating the respective digital work or submitting the respective digital work to the searchable database.

5. A computer system as claimed in claim 1, the categorization table for each digital work further including a geographical categorization.

6. A computer system as claimed in claim 5, the geographical categorization including common geographic boundaries, culturally expressed boundaries, distances from a certain location, a user's hometown, a user's current location or a user's areas of frequent travel.

7. A computer system as claimed in claim 6, computer program further including instructions to: automatically provide a list of geographical categorizations in total or in part.

8. A computer system as claimed in claim 1, the categorization table for each digital work further including a demographic categorization, the demographic categorization referring to demographics of a target audience of the respective digital work.

9. A computer system as claimed in claim 1, the categorization table for each digital work further including a maturity level categorization.

10. A computer system as claimed in claim 9, computer program further including instructions to perform the search of the searchable database at least partially based on maturity level categorization.

11. A computer system as claimed in claim 1, the computer program further including instructions to display a given digital work and one or more keywords in the updated set of navigational keywords for the given digital work.

12. A computer system as claimed in claim 11, the computer program further including instructions to:

in response to a user selecting one of the displayed navigational keywords, perform a search of the searchable database by matching the selected displayed navigational keyword with the navigational keywords in categorization tables associated with other digital works, resulting in search results.

13. A computer system as claimed in claim 12, the computer program further including instructions to:

return and display a list of other navigational keywords, the other navigational keywords being navigational keywords of the categorization tables associated with the other digital works in the search results.

14. A computer system as claimed in claim 13, the computer program further including instructions to:

narrow or adjust the search results in response to the user operating on one of the other navigational keywords.

15. A computer method for categorizing digital works using user-suggested keywords on a global computer network, said method comprising:

storing, in a searchable database, a plurality of digital works, and an index comprising categorization tables associated with each of the plurality of digital works, each respective categorization table storing:

a set of navigational keywords for the digital work, a set of user-suggested keywords for the digital work, and a count of user that submitted each of the user-suggested keywords;

for each of the plurality of digital works:

providing, to client devices associated with a respective user, the digital work with a form for accepting user-suggested keywords for the digital work, accepting one or more user-suggested keywords, compiling the one or more user-suggested keywords into the set of user-suggested keywords, and determining, for each of the one or more user-suggested keywords, the count of users that submitted each keyword;

without further human intervention and for each respective categorization table, adding at least some of the user-suggested keywords for the digital work to the set of navigational keywords for the associated digital work, based on the count of users that submitted each of the user-suggested keywords, thereby generating an updated set of navigational keywords, and resulting in an updated index; and in response to a request from one of the client devices:

performing a search of the searchable database using search terms received from the client device and the updated index; and returning search results to the client device.

16. A computer method as claimed in claim 15, the categorization table for each digital work further including a geographical categorization and a demographic categorization.

17. A computer method as claimed in claim 15, further comprising:

providing to users on-line reading access to the plurality of digital works, different digital works having different respective authors; and enabling a respective author to designate which users are allowed to view the digital work.

18. A computer method as claimed in claim 15 further comprising:

for each digital work, (i) obtaining ratings from each user that views the digital work and (ii) making a determination of quality of the digital work based on the obtained ratings across users, the ratings being in multiple rating areas and include actions taken on that digital work by a user.

19. A computer method as claimed in claim 18, the determination of quality being further based on an average rating across all users that viewed the a digital work to determine quality of the digital work.

20. A computer method as claimed in claim 18, further comprising rating an author of a given digital work within a taxonomical category or within a keyword combination based on average rating of digital works by that author.

21. A computer method claimed in claim 18, the obtained ratings including ratings from experts in addition to or instead of users wherein one or more experts are allowed to promote the digital work.

22. A computer method as claimed in claim 18, further comprising determining popularity of an digital work based on any combination of how many times the digital work is read, bookmarked, forwarded, recommended among users, commented on and subscribed to.

23. A computer method as claimed in claim 22, further comprising ranking authors or digital works by popularity within taxonomical categories and within keyword combinations.

24. A computer method as claimed in claim 22, the popularity of an author being determined based on average popularity of the author's respective digital works.

25. A computer method as claimed in claim 18, further comprising counting a number of times that the given user recommends the digital work to other users.

26. A computer method as claimed in claim 18, further comprising generating a ranked list of suggested digital works for a user based on at least one of users ratings of digital works, experts ratings of digital works, respective relevance of digital works to the user, and editorial promotion of certain digital works.

27. A computer method as claimed in claim 26, further comprising adjusting the list of suggested digital works with respect to (i) all digital works of the system, (ii) digital works within one taxonomical category, (iii) digital works of one keyword or keyword combination, (iv) digital works by a certain user, or (v) a user-selected subset of digital works.

28. A computer method as claimed in claim 15, further comprising:

for a given user, generating a ranked list of suggested reading based on digital works viewed by one or more other users each having a respective profile similar to the profile of the given user.

29. A computer method as claimed in claim 15, further comprising measuring (i) words and word combinations an user uses, and (ii) words and word combinations a user reads, and generating a profile of a user based on said measured words and word combinations.

30. A computer method as claimed in claim 29, further comprising generating a list of suggested reading for the user based on digital works viewed by one or more other users each having a respective profile similar to the profile of the user.

31. A computer method as claimed in claim 15, further comprising:

displaying a given digital work and one or more navigational keywords in the updated set of navigational keywords for the digital work.

32. A computer method as claimed in claim 31, further comprising:

in response to a user selecting one of the displayed navigational keywords, perform a search of the searchable database by matching the selected displayed navigational keyword with the navigational keywords in categorization tables associated with other digital works, resulting in search results.

33. A computer method as claimed in claim 32, further comprising:

returning and displaying a list of other navigational keywords, the other navigational keywords being navigational keywords of the categorization tables associated with the other digital works in the search results.

34. A computer method as claimed in claim 33, further comprising:

narrowing or adjusting the search results in response to the user operating on one of the other navigational keywords.

* * * * *